(12) United States Patent
Kusunoki

(10) Patent No.: US 8,798,170 B2
(45) Date of Patent: Aug. 5, 2014

(54) PROGRAM RECOMMENDATION APPARATUS

(75) Inventor: Yoshiaki Kusunoki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 881 days.

(21) Appl. No.: 12/561,809

(22) Filed: Sep. 17, 2009

(65) Prior Publication Data

US 2010/0071005 A1   Mar. 18, 2010

(30) Foreign Application Priority Data

Sep. 18, 2008  (JP) ................................. 2008-239468

(51) Int. Cl.
*H04N 5/455* (2006.01)
*H04N 5/14* (2006.01)
*H04N 21/466* (2011.01)

(52) U.S. Cl.
CPC .......... *H04N 5/147* (2013.01); *H04N 21/4668* (2013.01)
USPC .................................. 375/240.26

(58) Field of Classification Search
USPC .................................. 375/240.26
See application file for complete search history.

(56) References Cited

U.S. PATENT DOCUMENTS

| | | | | |
|---|---|---|---|---|
| 5,532,833 A * | 7/1996 | Hong et al. | ................... | 386/241 |
| 7,209,942 B1 * | 4/2007 | Hori et al. | .................... | 709/203 |
| 7,272,183 B2 * | 9/2007 | Abiko et al. | ............. | 375/240.16 |
| 2002/0159750 A1 * | 10/2002 | Jasinschi et al. | ................ | 386/46 |
| 2005/0149557 A1 | 7/2005 | Moriya et al. | | |
| 2006/0271958 A1 | 11/2006 | Ukai et al. | | |
| 2007/0050262 A1 * | 3/2007 | Van Breemen et al. | ......... | 705/26 |
| 2007/0186267 A1 | 8/2007 | Ohde et al. | | |
| 2008/0172696 A1 | 7/2008 | Furusawa et al. | | |

FOREIGN PATENT DOCUMENTS

| | | |
|---|---|---|
| CN | 101036386 | 9/2007 |
| CN | 101127899 | 2/2008 |
| JP | 2000-013708 A | 1/2000 |
| JP | 2000-115646 A | 4/2000 |
| JP | 2002-369090 A | 12/2002 |
| JP | 3579263 B2 | 7/2004 |
| JP | 2005-73190 A | 3/2005 |
| JP | 3801878 B2 | 5/2006 |
| JP | 2007-13911 A | 1/2007 |

* cited by examiner

*Primary Examiner* — Mark Rinehart
*Assistant Examiner* — Maharishi Khirodhar
(74) *Attorney, Agent, or Firm* — Birch, Stewart, Kolasch & Birch, LLP

(57) ABSTRACT

A program recommendation apparatus includes a scene attribute extraction unit (24, 32) for extracting attributes of scenes included in audio-video content, a frequency distribution obtaining unit (25, 15) for counting occurrence frequencies of the scene attributes extracted scene by scene to obtain the frequency of each extracted attribute, and a recommended program selection unit that recommends audio-video content to be recorded or played back, based on a frequency distribution obtained by the frequency distribution obtaining unit (25,15). The program recommendation apparatus can recommend a program to be played back, from among recorded programs, according to users' preferences and interests, even if the recorded programs lack pre-provided program information or attribute information.

11 Claims, 18 Drawing Sheets

FIG.2

| ATTRIBUTE CODE | ATTRIBUTE NAME | DECISION CRITERIA |
|---|---|---|
| C1 | SCENERY 1 | RIVER, SEA, ETC. MUCH BULE, WITH HIGH-FREQUENCY VIDEO COMPONENTS. |
| C2 | SCENERY 2 | MOUNTAINS, SKY, FIELDS, ETC. MANY BLUE OR GREEN COMPONENTS, NEARLY STILL OR SCENERY OTHER THAN C1 |
| C3 | MAN-MADE OBJECTS | TRAIN, CAR, PLANE, SHIP, BUILDING, HOUSE, ETC. |
| C4 | SPORTS (OUTDOOR) | STRENUOUS OUTDOOR HUMAN ACTIVITY. |
| C5 | SPORTS (INDOOR) | STRENUOUS INDOOR HUMAN ACTIVITY. |
| C6 | ANIMATION | FEW MIDDLE FREQUENCY VIDEO COMPONENTS. |
| C7 | MUSIC (POPS,ROCK) | DECIDE BY AUDIO FREQUENCY CHARACTERISTICS. |
| C8 | MUSIC (CLASSIC,JAZZ,BGM) | DECIDE BY AUDIO FREQUNCY CHRACTERISTICS. |
| C9 | FULL BODY OF PERSON | SMALL FACE SIZE IN RELATION TO FULL SCREEN. RECOGNIZE FACE AND BODY, OR PART OF BODY. |
| C10 | UPPER BODY OF PERSON | DETECT FACE, DRAMA, MOVIE, ETC. |

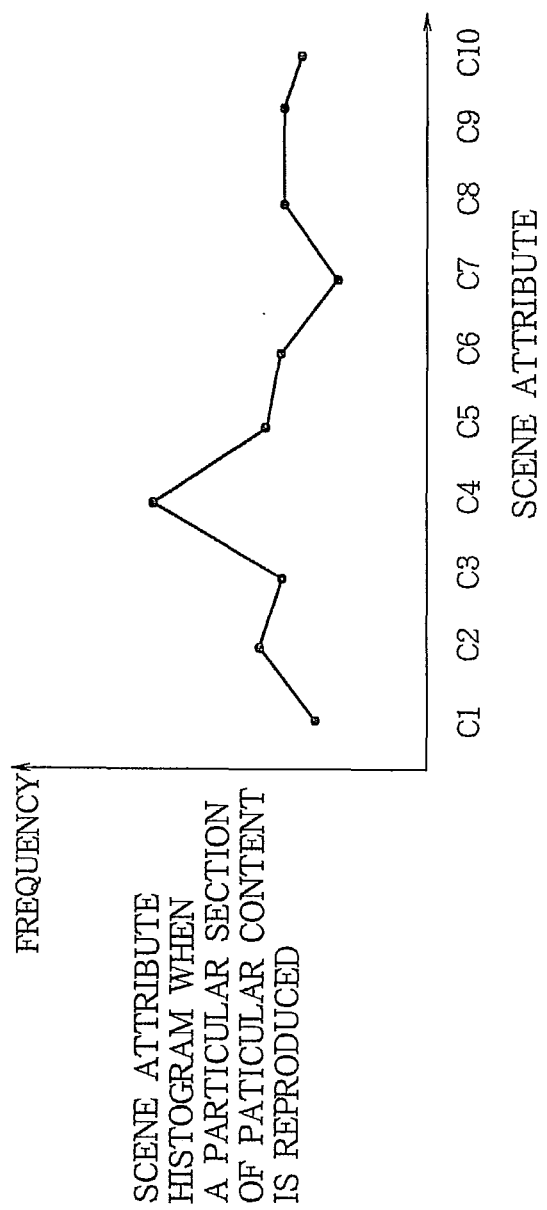

RECOMMENDATION HISTOGRAM

HISTOGRAM FOR PROGRAM #1

HISTOGRAM FOR PROGRAM #2

HISTOGRAM FOR PROGRAM #3

VIEWING HISTORY HISTOGRAM

LATEST VIEWED PROGRAM HISTOGRAM

WHEN LATEST VIEWED PROGRAM HISTOGRAM IS MOST HEAVILY WEIGHTED

FIG. 15

| ATTRIBUTE | KEY WORDS |
|---|---|
| MOVIE | SCENERY, PARK, STATION, BLUE SKY, CLOUDY SKY, RAIN, MEETING, PARTING, MEETING AGAIN, CONVERSATION, COFFEE SHOP, TRAIN, TAXI, BICYCLE, ADVENTURE, ACTION, EXPLOSION, FIRE, CAR CHASE, HIGHWAY, RUNNING, SHELTERING FROM RAIN. |
| DRAMA | SCENERY, PARK, STATION, FLOWER, BLUE SKY, CLOUDY SKY, RAIN, SHELTERING FROM RAIN, GOAL, MEETING, PARTING, MEETING AGAIN, CONVERSATION, COFFEE SHOP, TRAIN, TAXI, BICYCLE, SUPERHIGHWAY, ACCIDENT, RUNNING. |
| SPORTS | BALL, BASEBALL, SOCCER, GOAL, SCORE, BICYCLE, ERROR, HOME RUN, STRIKEOUT, RUNNING. |
| DOCUMENTARY | SCENERY, CONVERSATION, COFFEE SHOP, TRAIN, TAXI, SUPERHIGHWAY, ACCIDENT, COST, ECONOMY, RAIN, MEETING. |
| TRAVEL | SCENERY, STATION, —STATION, BOX LUNCH, FLOWER, BLUE SKY, CLOUDY SKY, RAIN, SHELTERING FROM RAIN, MEETING, PARTING, CONVERSATION, COFFEE SHOP, TRAIN, TAXI, BICYCLE. |
| VARIETY | QUIZ, QUESTION, ANSWER, GUEST, COMMENTATOR, IDOL, MC, COMEDY, ENTERTAINMENT, PRIZE, DROPOUT, CHAMPION, EATING CONTEST, BLEEP. |
| ANIMATION | BICYCLE, ROBOT, DOLL, TELEPATHY, TRANSFORMATION, HERO, HEROINE, COMBINATION, —MAN, —GER, WARRIOR, MONSTER. |
| HOBBIES AND EDUCATION | HOBBY, ENGLISH CONVERSATION, FOREIGN LANGUAGE, MUSIC, INSTRUMENT. |

FIG.16 (a)

| SCENE NO. | TIME | KEY WORD |
|---|---|---|
| 1 | 0:00:00 | DISTANT VIEW |
| 2 | 0:00:12 | PARK |
| 3 | 0:00:20 | FLOWER |
| 4 | 0:00:35 | BALL |
| 5 | 0:00:40 | BASEBALL |
| 6 | 0:01:05 | RAIN |
| 7 | 0:01:11 | RUNNING |
| 8 | 0:01:23 | SHELTERING FROM RAIN |
| 9 | 0:01:42 | MEETING |
| 10 | 0:02:08 | PUDDING |
| 11 | 0:02:18 | AKIRA |
| 12 | 0:02:23 | YOKO |
| 13 | 0:02:32 | COFFEE SHOP |
| 14 | 0:03:05 | TRAIN |
| ⋮ | ⋮ | ⋮ |

FIG.16 (b)

| MOVIE | DRAMA | SPORTS | DOCUMENTARY | TRAVEL | ANIMATION |
|---|---|---|---|---|---|
| 1 | 1 |  |  | 1 |  |
| 1 | 1 |  |  |  |  |
|  | 1 |  |  | 1 |  |
|  |  | 1 |  |  |  |
|  |  | 1 |  |  |  |
| 1 |  | 1 | 1 |  |  |
| 1 | 1 |  |  | 1 |  |
| 1 | 1 |  | 1 |  |  |
|  | 1 |  |  |  |  |
| 1 | 1 |  |  |  |  |
| 1 | 1 |  |  |  | 1 |
| 1 |  |  | 1 | 1 | 1 |
|  |  |  | ⋮ |  |  |

PROGRAM RECOMMENDATION APPARATUS

BACKGROUND OF THE INVENTION

1. Field of the Invention

The present invention relates to a program recommendation apparatus that recommends programs for playback, distribution, or recording and enables recommendation of even programs having no information such as program attributes.

2. Description of the Related Art

The generally used method of recommending programs according to the users' preferences is to receive an EPG (Electronic Program Guide) from a broadcast or a network and recommend programs that the user would like to watch by using the categories included in the EPG information. There is also a method in which categories that that user wants to watch are received separately from the EPG information and are classified into EPG categories (see Japanese Patent Application Publication No. 2000-115646 (Para. 0015, FIG. 2)). There is also a method that analyzes preferences from a viewer's history of program selection operations etc. in order to analyze the viewer's preferences, and generates a program table based on viewing tendencies (Japanese Patent Application Publication No. 2000-13708 (Para. 0008, FIG. 2)). To determine users' preferences more precisely, there is another method that uses the presence or absence of user operations at the start and end of a program (Japanese Patent Application Publication No. 2002-369090 (Para. 0038, FIG. 1)).

However, the above conventional methods are problematic in that programs having no program information cannot be recommended.

SUMMARY OF THE INVENTION

The present invention addresses the above problem of the prior art, with the object of providing a program recommendation apparatus for recommending programs to be played back, from among recorded programs, according to users' preferences and interests even if the recorded programs lack pre-provided program information or attribute information.

A program recommendation apparatus according to this invention comprises:

a scene attribute extraction unit configured to extract attributes of scenes included in audio-video content;

a frequency distribution obtaining unit configured to count occurrence frequencies of the scene attributes extracted scene by scene to obtain the frequency of each extracted attribute; and a recommended program selection unit configured to recommend audio-video content to be recorded or played back, based on a frequency distribution obtained by the frequency distribution obtaining unit.

According to the program recommendation apparatus of the present invention, programs can be recommended for recording, playback, or distribution even if they do not have program information, by counting up their program attributes scene by scene.

BRIEF DESCRIPTION OF THE DRAWINGS

In the attached drawings:

FIG. 2 is a table illustrating relationships between exemplary scene attributes and corresponding decision criteria used in the first embodiment;

FIG. 6 is a histogram indicating the occurrence frequencies of scene attributes when a particular section of a program is played back in the first embodiment;

FIG. 7($b$) to FIG. 7($d$) are histograms for a plurality of programs;

FIG. 15 is a drawing illustrating exemplary relationships between attributes and keywords, used in the second embodiment;

FIGS. 16($a$) and 16($b$) are drawings illustrating an exemplary result of the matching of attributes to scenes in the second embodiment;

DETAILED DESCRIPTION OF THE PREFERRED EMBODIMENTS

Figure 1:
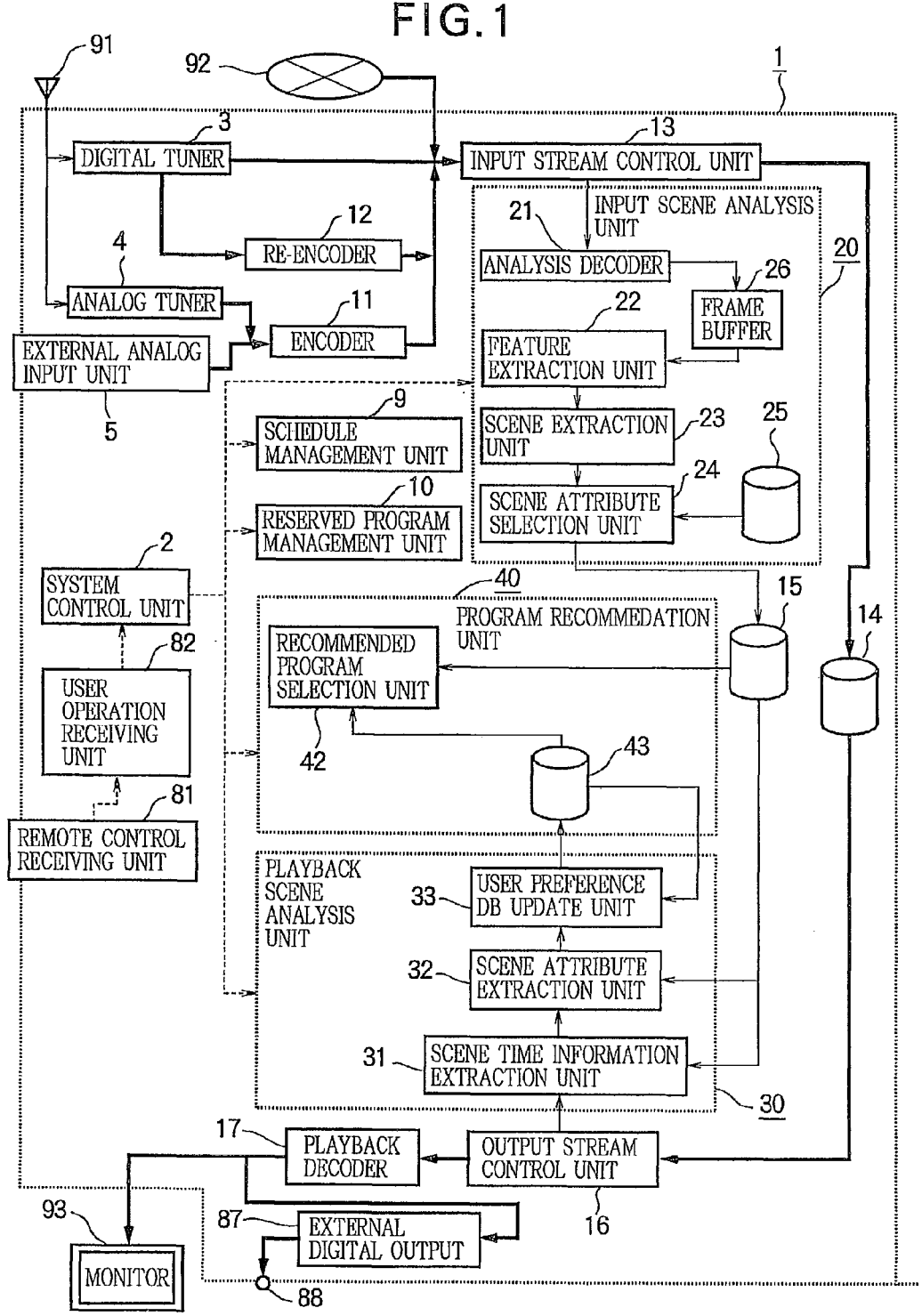
FIG. 1 is a block diagram illustrating the structure of a recording and playback apparatus having a program recommendation apparatus in a first embodiment of the invention.

Embodiments of the invention will now be described with reference to the attached drawings, in which like elements are indicated by like reference characters.

First Embodiment

FIG. 1 is a block diagram illustrating the structure of a recording and playback apparatus 1 having a program recommendation apparatus according to the first embodiment of the invention.

First, a method of recording and playing back a program will be described with reference to FIG. 1. The recording and playback apparatus 1 is connectable with an external antenna 91 and a network 92; if necessary, another video playback apparatus (not shown) can be connected with an external analog input unit 5.

The antenna 91 is capable of receiving digital or analog broadcasts that distribute audio-video content.

To receive a digital broadcast, a digital tuner 3 selects a channel specified by a user. The digital tuner 3 demodulates the broadcast signal and sends the transport stream of the specified channel to an input stream control unit 13. The input stream control unit 13 accepts the audio-video content of the received transport stream, and records the content in a program storage unit 14.

Usually, in a digital broadcast, MPEG-2 video and AAC (Advanced Audio Coding) audio are multiplexed in an MPEG-2 transport stream. When a high-definition broadcast is transmitted as MPEG-2 video, if direct recording were to be attempted, the recording rate requirement would be 20 Mbps or higher at the system rate, and this would strain the capacity of the program storage unit 14, which is implemented by an HDD or the like. To increase the recording density, there are high-compression methods based on MPEG-4 AVC/H.264 encoding. In this embodiment, to increase the recordable time in the program storage unit 14, a re-encoder 12 for re-encoding MPEG-2 video to MPEG-4 AVC/H.264 is provided.

When the transport stream output from the digital tuner 3 is re-encoded to MPEG-4 AVC/H.264, it is routed through the re-encoder 12 to the input stream control unit 13. The subsequent processing is the same as for MPEG-2 video.

In an analog broadcast, when the analog tuner 4 selects a user-specified channel, the video signal of the specified channel is output, subjected to A/D conversion by an A/D converter (not shown), input to an encoder 11, compressively encoded by MPEG-2, for example, and thereby converted to a bit stream. The bit stream is then sent to the input stream control unit 13, and the subsequent processing is the same as for a digital broadcast.

Like an analog broadcast, a video signal input from the external analog input unit 5 is converted to a bit stream and sent to the input stream control unit 13.

The input stream control unit 13 has an internal buffer (not shown) that permits stable writing to the program storage unit 14; the bit stream sent to the input stream control unit 13 is recorded temporarily in the internal buffer, and held in the buffer in the input stream control unit 13 until a write request to the program storage unit 14 becomes executable.

The program storage unit 14 includes an HDD (hard disk drive), flash memory, an optical disc drive, a magneto-optical disk drive, or the like; any type of medium can be used.

In addition to the compressed stream of broadcast program content, playback control information corresponding to the stream is recorded in the program storage unit 14. The playback control information includes the title, duration, recording start time, and stream encoding method of the content, as well as time information for so-called entry points and information giving their positions from the beginning of the stream, and information indicating the times (playback time from the beginning to that point) and addresses of so-called chapter points used as jump destinations in skip operations. Of the playback control information, the title, recording start time, duration, and encoding method are used when the user selects the content. The entry and chapter information is used in reading the stream from the program storage unit 14 and sending it to the decoder or editing means when the content is played back or edited.

Next the programmed recording operation will be described. When an arbitrary program is set for programmed recording at a request from the user or another source, a reserved program management unit 10 performs supervisory operations such as determining whether the program to be recorded (the reserved program) is valid or invalid, determining whether it will interfere with another reserved program, and so on.

When a user requests programmed recording of an arbitrary program, the reserved program management unit 10 obtains information such as the start time, end time, channel number, and genre of the program from an EPG (Electronic Program Guide, not shown) or the like, makes checks such as checking whether there is another reserved program in the same time span, and if there is no problem, schedules recording of the specified program to start at the specified time, in a schedule management unit 9.

A little (five minutes or so) ahead of the start time of the program specified for programmed recording, the main power of the recording and playback apparatus 1 is automatically turned on at a command from the schedule management unit 9, and the recording operation starts at a further command from the schedule management unit 9. The recording proceeds as described earlier. Even when the main power of the recording and playback apparatus 1 is turned off, the schedule management unit 9 itself continues operating on power supplied separately.

Next, playback will be described. When the user issues a playback request to the recording and playback apparatus 1 by use of a remote controller (not shown), for example, a remote control receiving unit 81 receives signals from the remote controller and sends the contents of the request to a user operation receiving unit 82.

Besides accepting requests from the remote controller, the user operation receiving unit 82 also accepts requests from the operation panel of the recording and playback apparatus 1, requests input by operating a user interface screen, which will be described later, and requests from the network 92, and sends requests from the remote controller to the system control unit 2 together with those signals.

The system control unit 2 checks status transitions and apparatus statuses, such as whether the recording and playback apparatus 1 is playing back another program, whether the program specified for playback is present, and whether the recording and playback apparatus 1 is in an abnormal condition, and if it decides that playback is possible, sends control signals for performing playback to the units of the apparatus. As a result, the bit streams recorded in the program storage unit 14 are sent to an output stream control unit 16 and written temporarily in an internal buffer (not shown) provided in the output stream control unit 16.

The playback decoder 17 receives audio and video bit streams supplied from the output stream control unit 16, decodes the bit streams, and outputs the decoded audio and video. To allow uninterrupted audio and video playback, an internal buffer is provided in the output stream control unit 16. The internal buffer will be described below. Video output timing is periodic, occurring at a rate referred to as a frame rate; NTSC video output takes place at a frame rate of 29.97 Hz. In MPEG-2, MPEG-4/AVC, and other encoded bit streams, however, the bit rate per second is not constant but varies with the complexity of the video. The output timings of the playback of audio and video must match, and for that purpose, the operation of either the video decoder or the audio decoder must be turned on and off. For that reason, the bit streams read from the program storage unit 14 are not input to the decoder at the same rate but are read into the decoder dynamically, depending on the video output status. The HDD, optical disc, or other device by which the program storage unit 14 is implemented cannot output the required data immediately. Given this type of playback situation, the bit stream cannot be output from the program storage unit 14 at a constant rate. Accordingly, a buffer is provided in the output stream control unit 16 so that bit streams can be temporarily held and can be transferred immediately at a bit stream request from the playback unit 17.

The recording and playback apparatus 1 also has an external digital output unit 87 for outputting decoded video data to HDMI (High-Definition Multimedia Interface) devices, for example, and outputs digital audio and video from an external digital output jack 88.

Although not shown in the drawings, the bit streams can also be output directly, without passing through the playback unit 17, to a network terminal or an IEEE 1394 terminal, for example.

Next, the input scene analysis unit 20, which operates during recording to extract audio and video features from the audio and video bit streams and extract scene attributes, will be described. For stable recording in the program storage unit 14, the bit streams are temporarily recorded in the input stream control unit 13. Compressive coding systems such as MPEG-2 and MPEG-4/AVC, which encode ordinary video information and thereby compress it, usually operate at high compression by using the correlation among video frames, but the stream also includes, from place to place, frames with only intraframe compression (key frames), for resuming decoding in special playback modes. In the first embodiment, scene analysis, which will be described later, is performed on each key frame.

When a key frame is detected, the input stream control unit 13 sends an analysis decoder 21 the starting address of the key frame on the buffer in the input stream control unit 13, the data size of the key frame, the data size of the interval up to the next key frame, and the time information of the key frame.

The analysis decoder 21 starts decoding processing from the starting address of the key frame and has a frame buffer 26 hold the decoded video data.

A feature extraction unit 22 creates a video information histogram from the video data held in the frame buffer 26.

The video information histogram is, for example, a frequency distribution of luminance (Y) and color difference (Cb, Cr) components of the video data. A luminance and color difference histogram is used here to characterize the video, but other color representation spaces such as RGB may be used. Besides histograms, camera parameters such as motion vectors and focus position may be used.

A scene extraction unit 23 detects scene changes in the video-audio content and extracts the part from one scene change to the next scene change as a single scene.

The scene extraction unit 23 holds the video information histogram of the preceding frame in order of video output, compares the video information histogram of a newly decoded frame with the video information histogram of the preceding frame to obtain a difference d, compares it with a predetermined threshold value, and if the difference exceeds the threshold value, decides that a scene change has occurred.

If the video information histogram $H_i$ of the ith frame is $$H_i = \{h_i(1), h_i(2), \ldots, h_i(K)\}$$

then the difference d between the video information histogram $H_i$ of the ith frame and the video information histogram $H_{i-1}$ of the preceding (i−1)th frame can be obtained from the formula below. K is the total number of classes (the sum of the total number of luminance classes and the total number of Cb and Cr color difference classes).

$$d = \frac{1}{N} \times \sum_{k=1}^{K} |h_i(k) - h_{i-1}(k)|$$

N is the number of pixels in a single frame. Pixels representing luminance Y and pixels representing color differences Cb, Cr are counted separately. The difference d takes values from 0 to 2: if the same picture appears in the ith frame and the (i−1)th frame, the difference d becomes 0; if there is a great difference between the pictures in the ith frame and the (i−1)th frame, the difference d approaches 2.

When the scene extraction unit 23 decides that a scene change has occurred, the video content up to the occurrence of the next scene change is treated as a single scene. The picture in the key frame used in deciding that the scene change occurred is used as a representative image (thumbnail) of the scene.

Pattern data for use in deciding the characteristics and tendencies of scenes from the visual feature information of their thumbnails are held in an attribute list memory 25. Information (pattern information) for use in pattern matching is recorded: information for deciding, for example, that a scene having much green color, as determined from the video information histogram, is a nature or landscape scene; that a scene having much green color in a program labeled as a sports program by its EPG genre information is an outdoor sports scene; and that a scene having skin color at the focus position of the camera parameter is a scene of a person. Pattern information is also recorded for deciding, from the frequency of occurrences of scene changes, that a picture with much panning of the camera is a sports picture is also recorded, and pattern information is recorded for identifying conversation scenes by using a face detection function or the like to detect faces.

For a more specific example, the scene attributes C1 to C10 listed in FIG. 2 may be specified beforehand, and scene attributes may be determined by pattern matching to check whether the conditions in the decision criteria field in FIG. 2 are satisfied.

A scene attribute selection unit 24 extracts the attributes of each of the scenes extracted by the scene extraction unit 23; it compares the attributes of the extracted scene with the decision criteria recorded in the attribute list memory 25, and if a high proportion of the decision criteria are met, that is, if they match the pattern information that associates attributes with pictures (if a high proportion is matched), an attribute of the scene is identified in accordance with the decision result; the identified attribute information C1 to 010 of the scene is recorded in a scene attribute database 15, together with the time information (start time, end time, duration) of the scene and the address information (position from the beginning of the program, byte length).

By executing this analysis process from the beginning to the end of a program or for an arbitrary section, a scene attribute histogram indicating the frequency distribution of scenes in the whole program or an arbitrary section thereof can be obtained by counting occurrences of scene attributes in the corresponding period (from the beginning to the end of the program or the arbitrary section).

The scene attribute selection unit 24 also generates a frequency distribution (histogram) representing the attributes of the program by cumulatively adding the frequency distribution of each of the attributes in the plurality of scenes.

The scene attribute selection unit 24, attribute list memory 25, and scene attribute database 15 constitute a frequency distribution obtaining unit configured to count the occurrences (frequency) of each of the attributes extracted scene by scene from recorded audio-video content to obtain the frequency of each attribute, obtained by counting.

Figure 3:
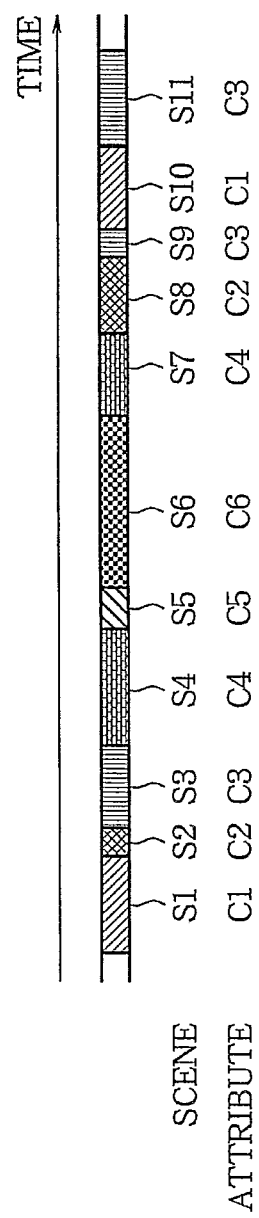
FIG. 3 shows an exemplary result of the detection of attributes scene by scene in the first embodiment.
Figure 4:
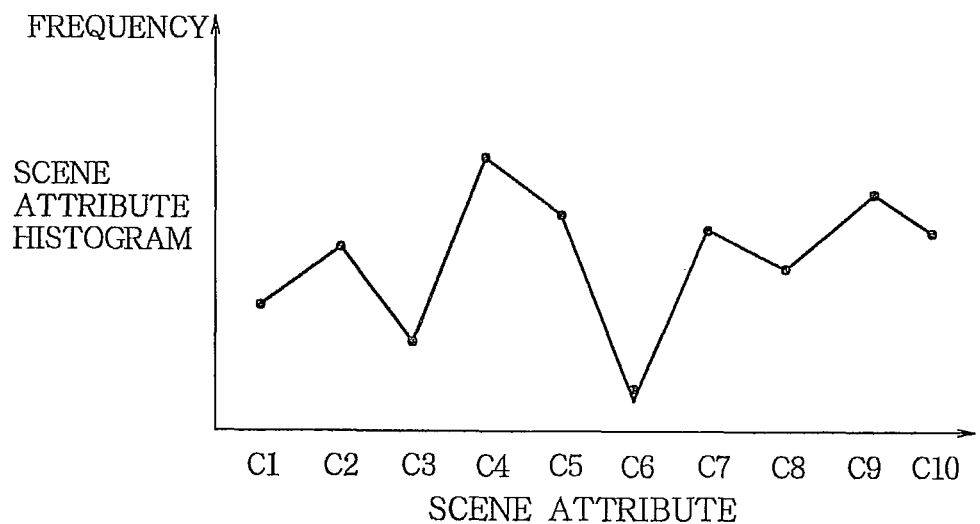
FIG. 4 is a histogram of the detected scene attributes in the first embodiment.

FIG. 3 is a diagram schematically illustrating a program divided into scenes, to each of which an attribute is assigned. The scenes start and end at irregular times and positions, because they are delimited whenever a scene change occurs. If there is a pattern (matching pattern) in the attribute list memory 25 that matches a delimited scene to a high degree, a scene attribute is assigned (matched), such as attributes C1 to C6 in FIG. 3. By continuously performing the processes of assigning attributes to scenes and counting the number of times each attribute is assigned, it is possible to obtain a scene attribute histogram, which shows the frequency distribution of the scene attributes, as in FIG. 4. This scene attribute histogram indicates the distribution of scene characteristics in the whole program or an arbitrary section thereof. According to FIG. 4, attribute C4 occurred most frequently in the analyzed video, followed by attributes C9 and C5. It can also be seen that attribute C6 hardly occurred at all. This indicates that the example shown in FIG. 3 included many dynamic (moving) scenes, and many scenes recognized as sports-related images. By counting the occurrences of each of the scene attributes, a scene attribute frequency distribution can be obtained, and consequently, the pictorial tendencies of the whole program or an arbitrary section can be understood.

In addition, for a sports program or the like, for example, the excitement of each scene can be analyzed by using the video or audio. For example, a scene is judged to be exciting if the luminance distribution of its video signal centers on a high level, if the picture is full of movement, if there are many scene changes per unit time, or if the sound power (volume level) in the audio signal is high. If a sports program as a whole includes many exciting scenes, it can be inferred to be a very interesting program.

Next, playback processing will be described. In playback by a DVD recorder or HDD recorder, a program is generally played back from beginning to end without skipping or fast-forwarding, but there are also many times when favorite scenes are played back selectively by skipping unnecessary scenes. In the recording and playback apparatus 1 of the present embodiment, a program recommendation unit 30 analyzes the frequencies with which the user plays back scenes and infers the user's preferences from the results of analysis.

In playback, the bit stream to be decoded is held temporarily in the buffer of the output stream control unit 16. As in a recording operation, when the output stream control unit 16 detects a key frame in the held bit stream, it sends the time information and address information to a scene time information extraction unit 31; the scene time information extraction unit 31 obtains the corresponding scene according to this information; and a scene attribute extraction unit 32 obtains the attribute information of the scene from the scene attribute database 15.

Figure 5:
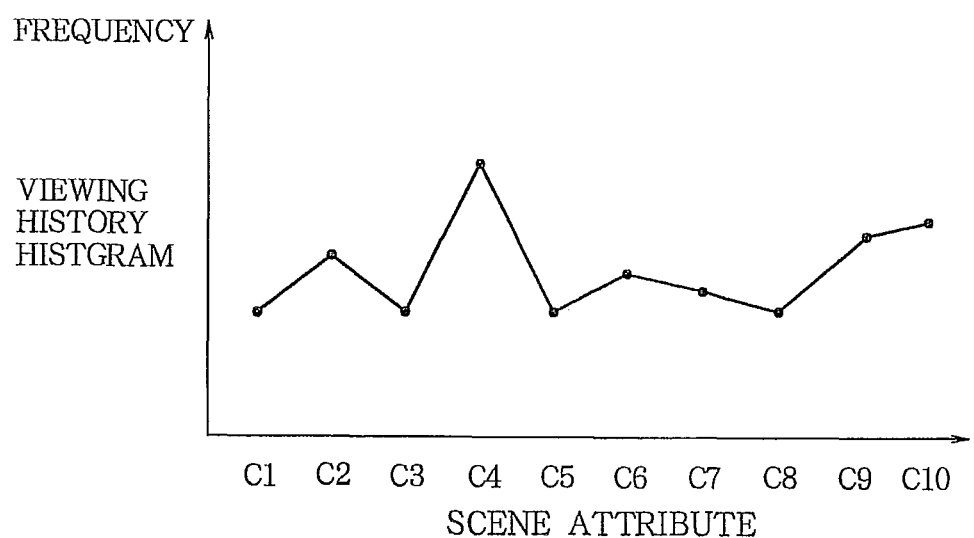
FIG. 5 is a histogram of a user's viewing history in the first embodiment.

A user's viewing history histogram generated in accordance with the user's playback or operation history, in the form of a frequency distribution expressing the playback frequency of attribute information (an example is shown in FIG. 5) is recorded in the user preference database 43. A user preference histogram generated from the user's viewing history histogram is also recorded. The user preference histogram may be generated by adding the frequencies of corresponding attributes in the user's viewing history histogram, in accordance with the genres of programs recorded, played back, or edited in the past, for example. The user's viewing history histogram may be used directly as the user preference histogram.

A user preference database update unit 33 updates the viewing history histogram recorded in the user preference database 43 each time a scene is detected or each time the process of playback of a program is finished. Accordingly, each time playback or another operation is carried out, the user's preferences can be reflected.

FIG. 6 shows a scene attribute histogram generated when a particular section is played back. It can be seen that the particular program section in FIG. 6 contains more occurrences of scene attribute C4 than any other attribute.

The user preference database update unit 33 and user preference database 43 constitute a frequency distribution obtaining unit configured to count the occurrences of each of the extracted attributes of the scenes of the played-back or distributed audio-video content and obtain frequencies of attributes, obtained by counting.

Next, cases in which the user requests a recommendation of a program to be viewed next will be described. An operation signal received by the remote control receiving unit 81 as a user's operation event from the remote controller is input through the user operation receiving unit 82 to the system control unit 2.

The system control unit 2 requests the recommended program selection unit 42 in the program recommendation unit 40 to recommend a program suited to the user's preferences.

Figure 7A:
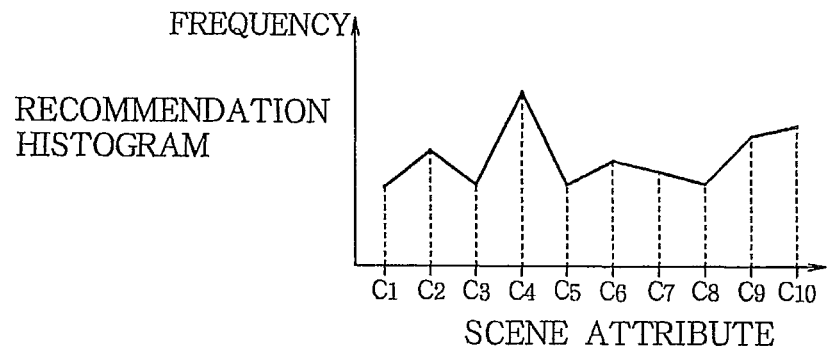
FIG. 7($a$) is a recommendation histogram generated from a user's viewing history according to the first embodiment.

The recommended program selection unit 42 generates a recommendation histogram (FIG. 7(a)) based on the user's viewing history histogram (FIG. 5) showing the user's operation history or the scene attribute histogram (FIG. 6) of a particular section of a program watched by the user.

The scene attribute histogram of a particular section of a program watched by the user, shown in FIG. 6, may be used directly as the recommendation histogram. Alternatively, a recommendation histogram may be generated from the scene attribute histograms obtained in playback of a plurality of programs, taking into account the current status of the recording and playback apparatus, such as the current time and the types of programs recorded in the program storage unit 14.

Figure 7B:
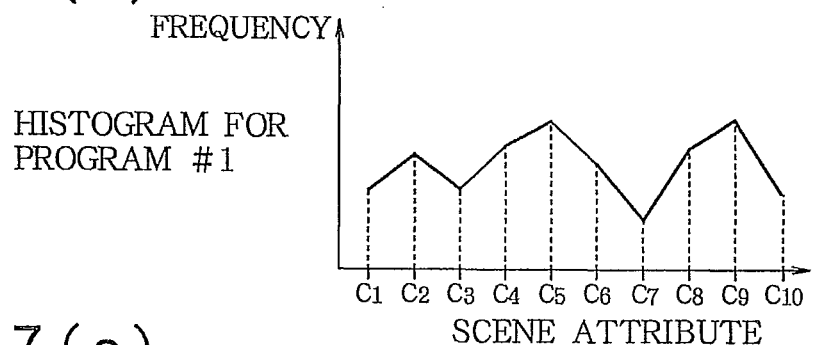
Figure 7C:
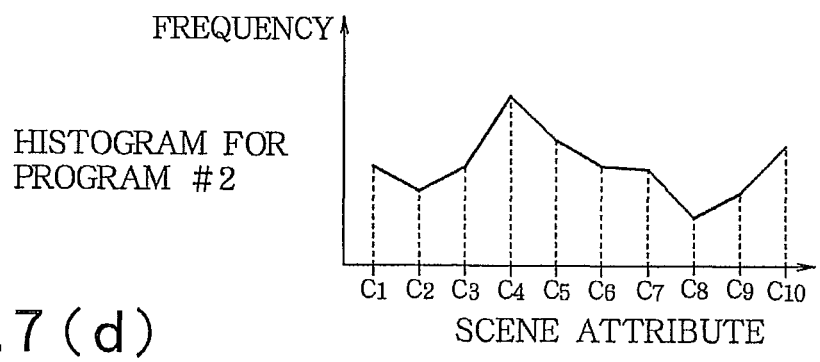
Figure 7D:
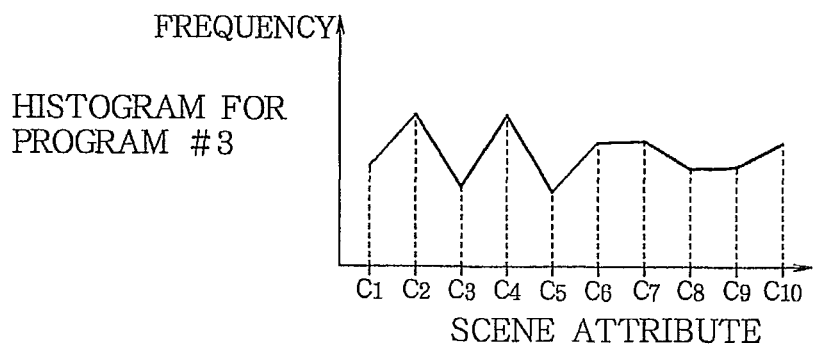

The generated recommendation histogram (FIG. 7(a)) is compared with separate scene attribute histograms (scene attribute frequency distributions of scenes of programs (FIG. 7(b), FIG. 7(c), FIG. 7(d))) of programs recorded in the scene attribute database 15, and programs with high correlativity are recommended (in descending order of correlativity).

The recommendations are supplied to the output stream control unit 16, combined with video information, then supplied through the playback unit 17 to a monitor 93, and displayed on the monitor 93. Among the sample histograms of programs #1, #2, and #3 shown in FIGS. 7(b), 7(c), and 7(d), program #3 is selected as having the highest correlativity with the histogram in FIG. 7(a).

In the example given above, program #3 is recommended first because the correlativity of the histograms is compared, but the method of deciding the order of program recommendation is not limited to correlativity of histograms; for example, if the decision criterion selects a program in which the same type of scene has the highest frequency, program #2, in which attribute C4 has the highest frequency, is selected. Statistical methods may also be used, and rank correlation coefficients or the like may be used to obtain the correlativity.

Figure 8:
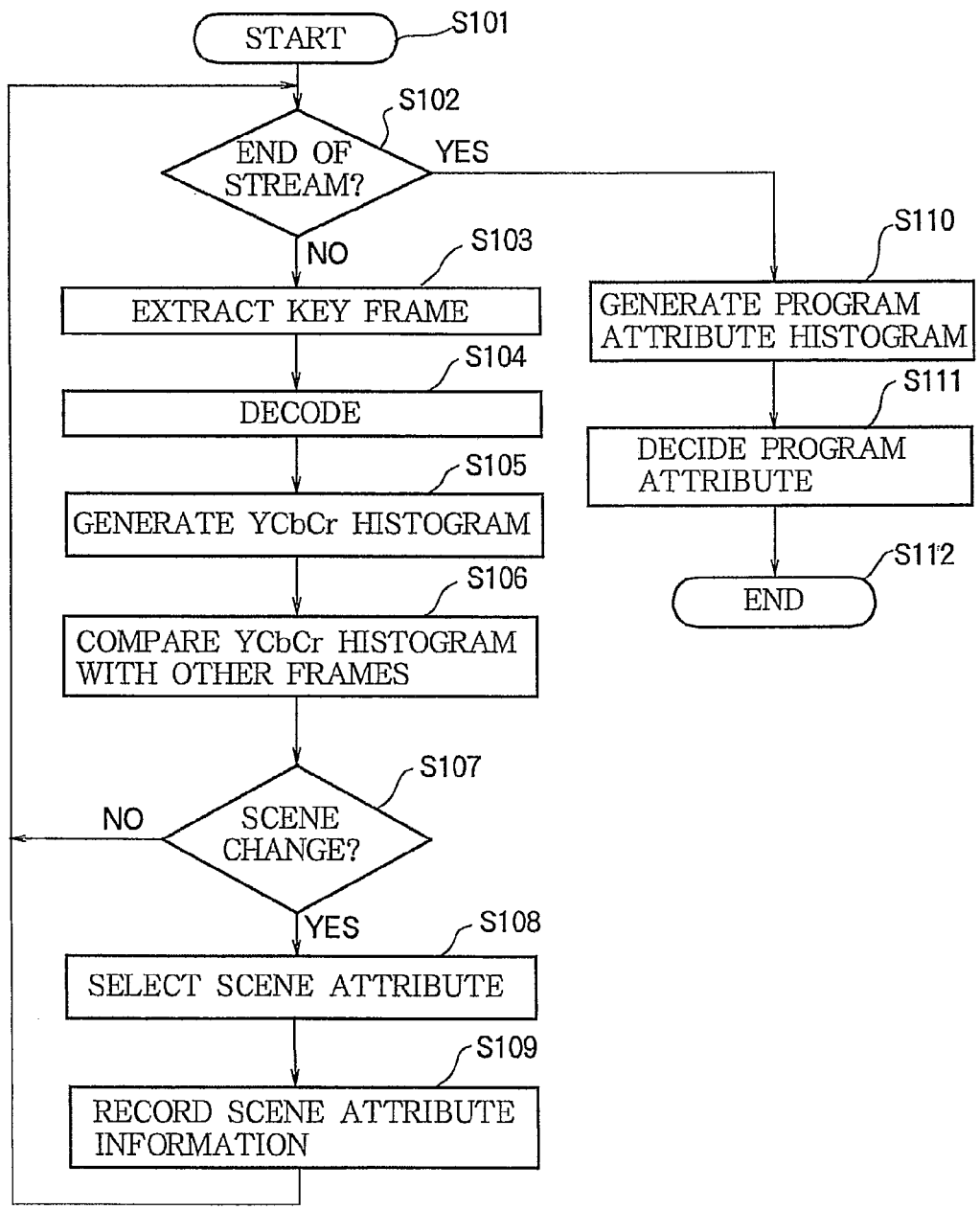
FIG. 8 is a flowchart illustrating a scene attribute extraction procedure in recording in the first embodiment.

Next, the flow of processing in recording will be described with reference to FIG. 8. When recording starts (S101), the bit stream to be recorded is loaded continuously into the input stream control unit 13.

The input stream control unit 13 detects the end of the recording stream (S102), and continues extracting key frames (S103) until the end is detected. When a key frame is extracted, the input stream control unit 13 extracts information about the key frame (start address of the key frame, data size of the key frame, the size of the interval up to the next key frame, and time information of the key frame). The analysis decoder 21 next decodes the key frame or an arbitrary frame between key frames (S104), and the feature extraction unit 22 generates a YCbCr video information histogram (S105).

Except when the generated video information histogram is the video information histogram of the first frame, the scene extraction unit 23 compares the video information histogram of a previous frame (the immediately preceding frame) with the latest video information histogram (S106), decides whether a scene change has occurred by deciding whether the difference value between the video information histograms exceeds a predetermined threshold value (S107), returns to step S102 if it decides that no scene change has occurred (NO in S107), and proceeds to step S108 if it decides that a scene change has occurred (YES in S107), in which case the scene attribute selection unit 24 determines the attribute of the scene according to how closely it matches the video information histograms prepared in the attribute list memory 25 and the scene change occurrence frequency pattern information (S108). If there is an attribute stored in the attribute list memory 25 with a degree of matching (approximation) that exceeds a given value, the attribute with the highest degree of matching is selected.

The scene attribute selection unit 24 next records the scene attribute extracted in step S108, together with the information (time information, address information) of the scene, in the scene attribute database 15 (S109).

This process is performed in the input stream control unit 13 until the end of the recording stream is detected, and when the end is detected (YES in S102), the scene attribute selection unit 24 generates a scene attribute histogram covering the entire program or the recorded section (S110). Statistical processing, such as normalizing the scene attribute histogram or 'zeroing' the occurrence frequency of the attribute with the smallest occurrence frequency or the occurrence frequencies of attributes with occurrence frequencies below a certain threshold value, and processing to modify the frequency distribution by using the EPG information and other attribute information obtained from the audio-video information or the like may be performed here. The scene attribute selection unit 24 also generates a frequency distribution (histogram) expressing the attributes (or tendencies) of the program by cumulatively adding the frequency distribution of each of the attributes in the plurality of scenes (S111).

Figure 9:
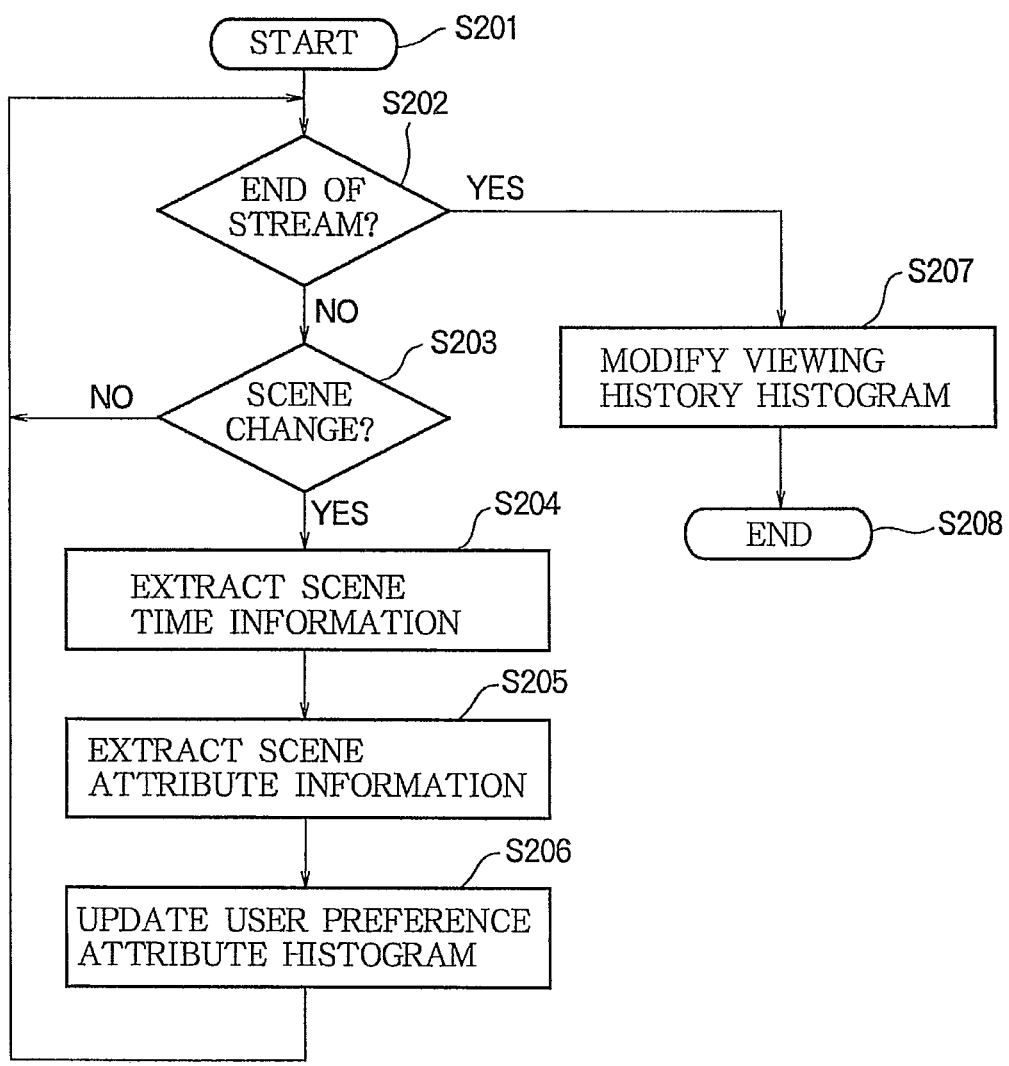
FIG. 9 is a flowchart illustrating a scene attribute extraction procedure in playback in the first embodiment.

Next, the user preference analysis processing performed in playback will be described with reference to FIG. 9. When the playback of a specified program starts at the user's request (S201), the bit streams read from the program storage unit 14 are temporarily stored in the internal buffer of the output stream control unit 16. The temporarily stored bit streams are read sequentially on request from the playback unit 17. The output stream control unit 16 detects the end of the stream being played back, detects temporary halts, and detects scene boundaries (S203). The scene boundaries can be found by using the time information and address information of each scene of the program recorded in the scene attribute database 15. Chapter boundaries, time boundaries, GOP boundaries, or the like may be used. When the output stream control unit 16 detects a scene change (YES in S203), the scene time information extraction unit 31 extracts the start time and duration of the scene from the scene attribute database 15 (S204), and the scene attribute extraction unit 32 extracts the attribute information of the scene (S205).

In step S206, the user preference database update unit 33 reads the frequency distribution of attributes of scenes played back by the user in the past (the viewing history histogram exemplified in FIG. 5), recorded in the user preference database 43, and adds the attribute information of the scene which is currently played back to the frequency distribution of the viewing history histogram it has read.

This process is performed until the output stream control unit 16 detects the end of the stream being played back or detects a halt (S202), and if the end is detected (YES in S202), a correction process is performed on the viewing history histogram (FIG. 5) (S207). The correction process means rewriting (updating) the viewing history histogram stored in the user preference database 43 with the new viewing history histogram obtained by the processing in step S206.

After step S207, the process ends (S208).

This process increases the occurrence frequency of attributes corresponding to scenes played back by the user and especially to scenes watched repeatedly, and does not increase the occurrence frequency of scenes watched only infrequently, so that an attribute histogram reflecting the user's preferences can be generated.

Figure 10:
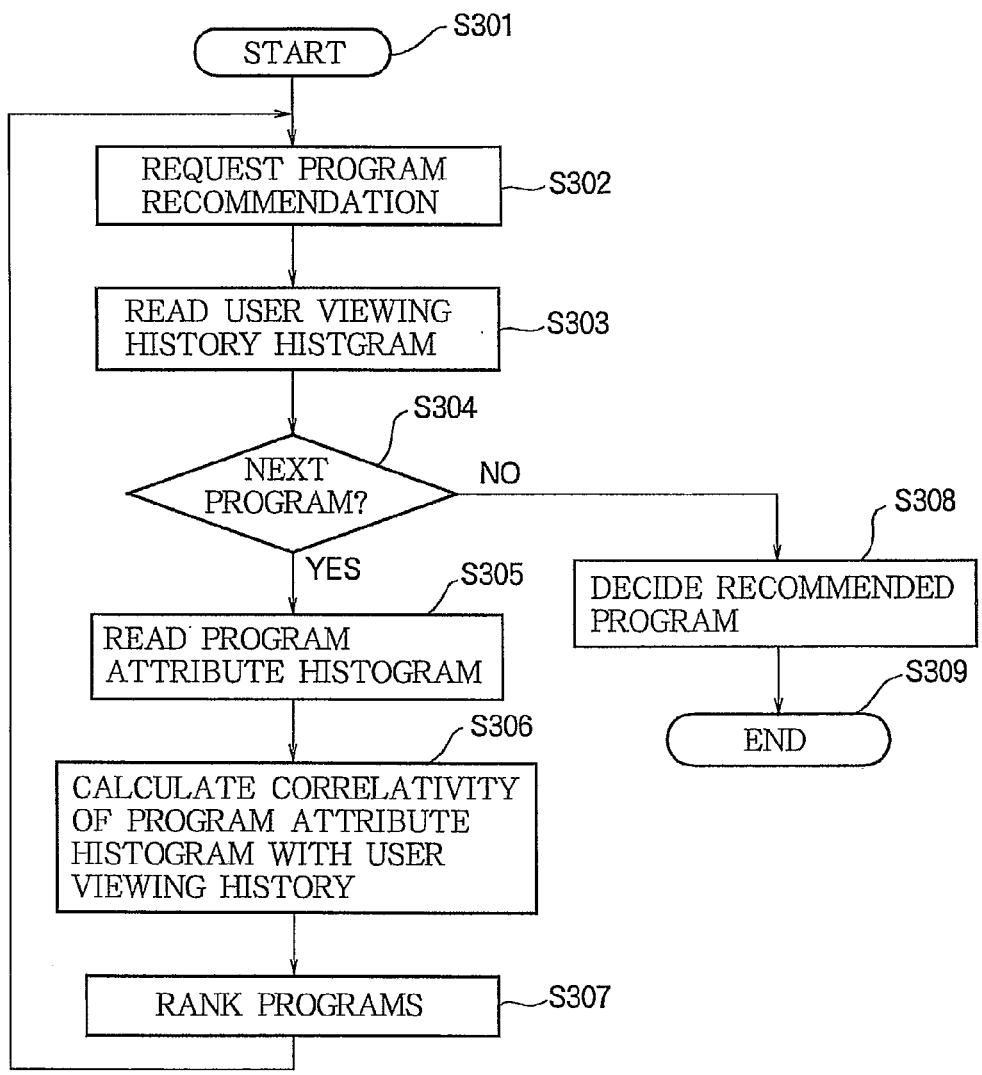
FIG. 10 is a flowchart illustrating a program recommendation processing procedure in the first embodiment.

Next, the method of extracting a recommended program will be described with reference to FIG. 10. When a request from the user for a program recommendation is sent from the user operation receiving unit 82 to the system control unit 2 (S302), the system control unit 2 asks the recommended program selection unit 42 to recommend a program accordingly.

The recommended program selection unit 42 reads the viewing history histogram (FIG. 5) from the user preference database 43 (S303). The recommended program selection unit 42 next searches through the scene attribute database 15 for a recorded program on which the process in step S305 and subsequent steps has not been performed (S304), and if there are any such programs, reads the attribute histograms of these programs (S305), has a correlativity comparison unit provided in the recommended program selection unit 42 obtain the correlativity between the scene attribute histograms of the programs thus read (FIG. 4 or FIGS. 7(b), 7(c), and 7(d)) and the viewing history histogram (FIG. 5) or recommendation histogram (FIG. 7(a)) (S306), and ranks the programs in accordance with their correlativity (S307). This operation is performed for all the recorded programs, and when there is no new program (that is, the processing of all the recorded programs is completed) (NO in S304), one or more recommended programs are determined in accordance with the ranking in step S307 (S308). Information indicating the recommended programs is, for example, supplied to the output stream control unit 16, combined with video information, supplied through the playback unit 17 to the monitor 93, and displayed on the monitor 93. After step S308, the process ends (S309).

If the viewing history histogram (FIG. 5) recorded in the user preference database 43 used by the recommended program selection unit 42 is not updated each time a scene is played back but is updated when the playback of a whole program is completed, when the user finishes watching a certain program, a program similar to that program is recommended by a function described below.

While the user is playing back an arbitrary program, each time a scene is played back, the scene attribute extraction unit 32 obtains the attribute information corresponding to the scene. The scene attribute extraction unit 32 accumulates the attribute information of scenes. Based on the accumulated information, a histogram of the program being played back is generated (FIG. 11(b)). This histogram indicates the tendencies of the attributes of the program played back most recently. The viewing history histogram in which the attributes of programs and scenes played back before are accumulated, excluding the program played back last, is recorded in the user preference database 43 (FIG. 11(a)).

Figure 11:
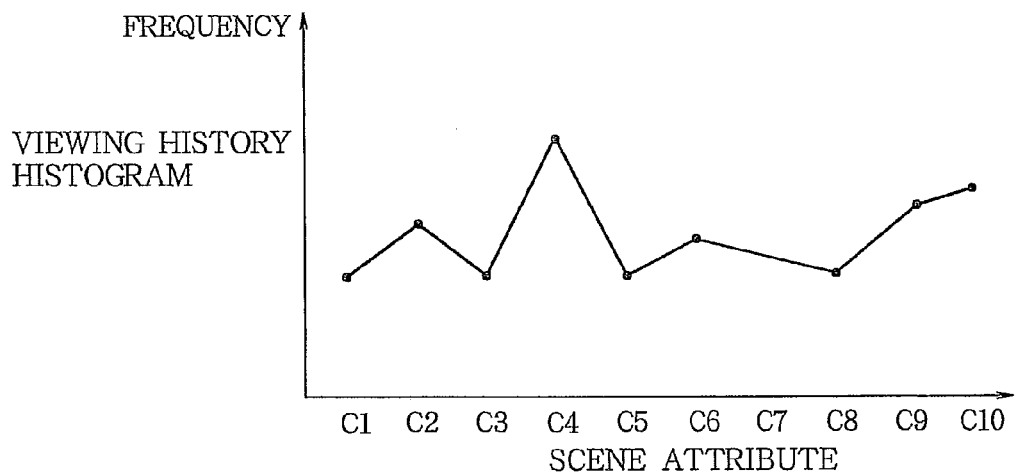
FIGS. 11($a$) to 11($c$) are drawings illustrating a method of combining histograms in the first embodiment.
Figure 11:
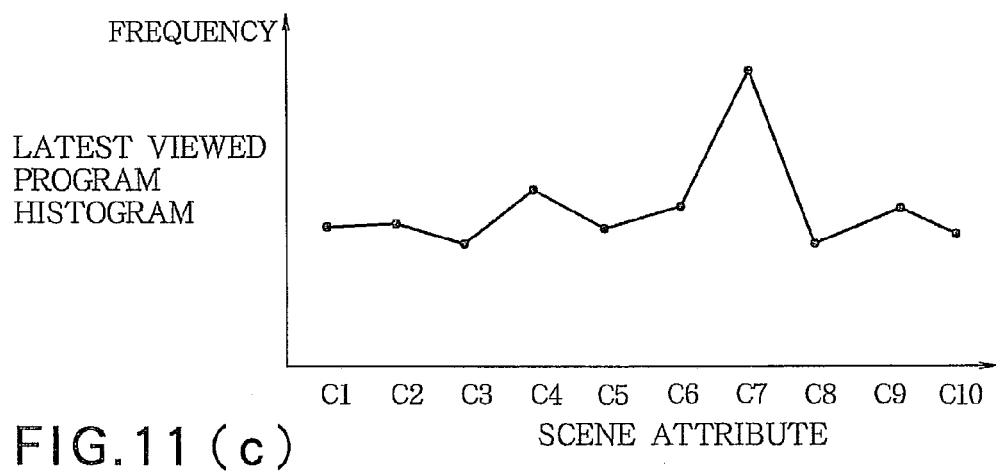
Figure 11:
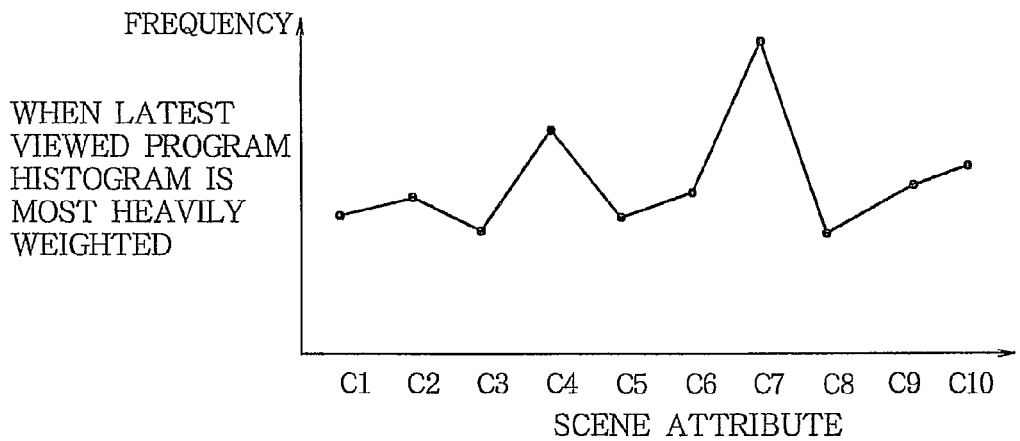

Except when the user is left with a strong impression of a particular program in the recording and playback apparatus, such as when the playback of the program has just ended, it is sufficient to recommend a program close to the user's viewing tendencies, in accordance with the histogram based on the viewing history, but when a strong impression of a particular program remains (the user remains most vividly aware of that program), such as when the playback of the program has just ended, it is often desirable to recommend a program similar to the program last played back. Therefore, it is desirable to recommend a program on the basis of a result of combining the histogram obtained from the program viewed most recently, as shown in FIG. 11(b), with the histogram based on the older viewing history (FIG. 11(a)). By searching for a program with a high correlativity with a histogram such as that shown in FIG. 11(c), obtained by this combination process, the histogram obtained from the program watched most recently being given the greatest weight, a program close to the program played back last can be recommended with the user's preferences (or viewing history) also being considered. The recommendation method can be adjusted by preparing a plurality of histogram patterns and combining them with assigned weights.

Next, examples of the user interface screen presented to the user will be shown. Operation signals input by use of these user interface screens are supplied to the user operation receiving unit 82. Suppose that the apparatus has a special button for activating the function that recommends a program to the user, such as a 'program recommendation button' (not shown) on a menu screen (not shown) or on a screen displayed while other processing is being performed. A case in which the program recommendation button is pressed after a program is played back (FIG. 12) and a case in which the program recommendation button is pressed after a pause button is pressed during playback (FIG. 13) will be described here.

Figure 12:
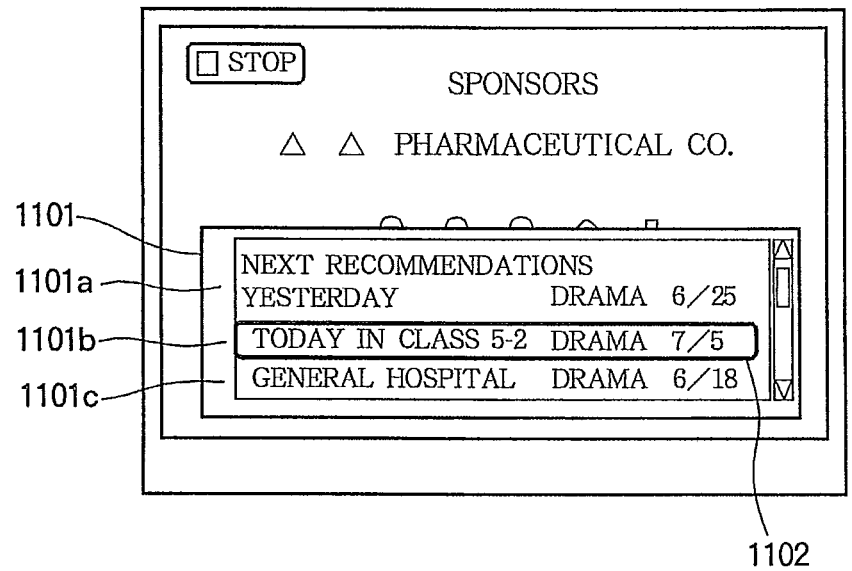
FIG. 12 is a drawing showing an exemplary user interface in the first embodiment.

The screen shown in FIG. 12 appears automatically, or at the user's press of the program recommendation button, when the playback of some program ends. This screen displays a list 1101 of programs recommended to the user for playback after the currently viewed program, in a menu form. The list 1101 shown has text information 1101a, 1101b, 1101c representing three programs. The text information of each program includes text expressing the title, genre, and recording date. In the example shown, the text information 1101b representing the second program is enclosed by a frame 1102, indicating that this item is selected.

After a serious (sober, no-nonsense) drama has been watched, another serious drama may be recommended. After a serialized program has been watched, the next program in the series may be recommended. These are cases in which a highly correlated program is recommended on the basis of the scene attribute histogram of the program just played back, by an analogous program recommendation function.

Figure 13:
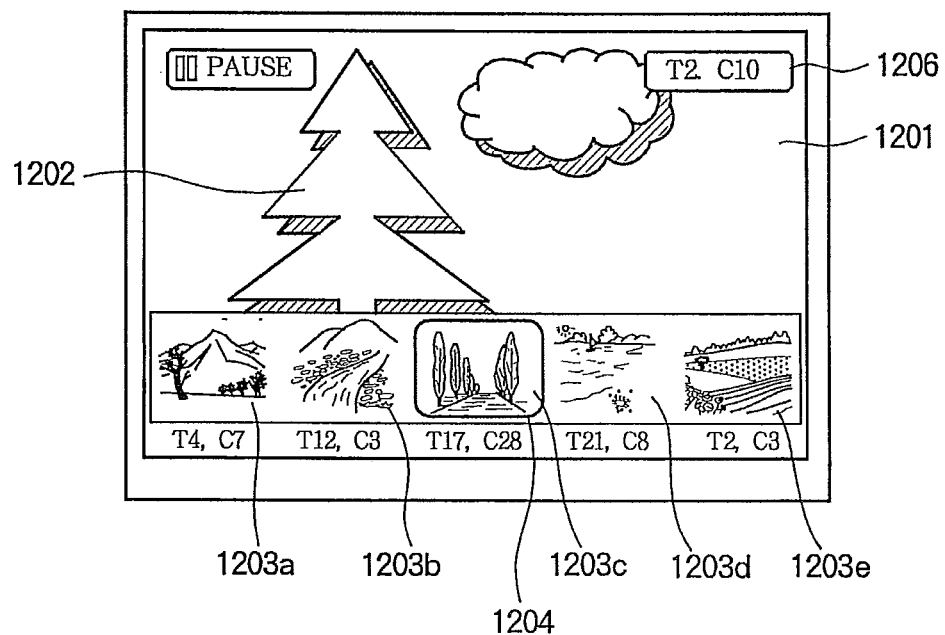
FIG. 13 is a drawing showing another exemplary user interface in the first embodiment.

FIG. 13 shows a case in which the program recommendation button is pressed while the playback of a program is halted and the screen is frozen. In this example, the scene being played back has sky 1201 in the background and a thicket of trees 1202 in the foreground, and a program recommendation is made from this scene. Here, one or more programs (one of which may be the current program) having the attributes of this scene, or having scenes closest to the frequency distribution of the attributes of this scene, is extracted from the scene attribute database 15, and representative images (thumbnails) thereof are displayed on the screen. Outdoor scenes such as scenes of a mountain, a river, trees lining a road, a beach, and a grassland are recommended from left to right at the bottom 1203 of the screen in FIG. 13. Characters such as 'T4' and 'T12' below the scenes represent the title numbers of the images, and characters such as 'C7' and 'C3' represent chapter numbers of the images. The characters 'T2, C10' in the top right corner of the screen represent the title number and chapter number of the image being displayed on the main screen. The user can play back a similar scene by selecting the program the user wants to watch most from the thumbnails 1203a to 1203e with the cursor keys on the remote controller. (In FIG. 13, thumbnail 1203c is enclosed by a frame 1204, indicating that it is selected.) This function recommends a matching or highly correlated sequence of scenes from the scene attribute histogram of the currently played-back scene itself or of preceding and following related scenes.

Although the scene attributes in the embodiment described above are predetermined, but scene attributes may be created or deleted dynamically. In particular, when the occurrence frequencies are concentrated on certain attribute values, the attributes showing high occurrence frequencies may be subdivided into pluralities of attributes to reduce the maximum value of the occurrence frequency.

As the description of attributes C7 and C8 in FIG. 2 indicates, the method of determining scene attributes is not limited to the use of video; audio information (volume, frequency) or other information may also be used.

In this embodiment, during recording and playback, scene attributes are analyzed once per key frame in a compressively encoded video bit stream, but the analysis may be carried out once per predetermined or arbitrary unit of time, once per chapter unit, or in other processing units based on metadata. Alternatively, all frame units may be analyzed.

The program recommendation apparatus of the first embodiment structured as described above can obtain attributes on a scene-by-scene basis. By using the attribute information obtained on a scene-by-scene basis, it can make attribute classifications on a scene-by-scene basis.

The attributes and tendencies of a whole program or a particular program section can be obtained by cumulatively adding the scene-by-scene attributes.

Because the features of a scene can be extracted from video or audio information, information other than the program itself, such as an EPG, is not required. Accordingly, an attribute classification can be made even when EPG information cannot be received.

Whereas an attribute classification made using an EPG can only classify with the attributes determined by the EPG information, the method of analyzing the audio and video directly permits classification with attributes other than those specified by the EPG information. For example, the scenes of programs can be classified as quiet video, video including much natural scenery, audio including rock music, children's voices, and so on. They can also possess attributes other than those determined by the EPG.

Since the attributes of a program comprising a plurality of scenes are expressed by a frequency distribution obtained by cumulatively adding the scene-by-scene attributes, the attributes of the program can be expressed by the levels of a plurality of attributes, and the attributes can be expressed with a higher degree of freedom than when the attributes of a program are expressed by binary values indicating present or absent.

Because the program attributes are represented by a frequency distribution, when a plurality of programs are compared, the comparison can be made not as to whether an arbitrary attribute is present or not but as to the level of an arbitrary attribute of the program, so that the degree of closeness or correlativity can be expressed in multiple steps.

When the correlativity among a plurality of programs is obtained, the correlativity among the programs can be obtained by obtaining the correlativity among the frequency distributions of the programs.

When the user's preferences are analyzed, the user's preferences are obtained on a scene-by-scene basis, rather than from whether or not the program as a whole has been played back or edited, so when the cumulative occurrence frequency of the scene attributes is obtained, decisions can be made and processing carried out in scene units: for example, repeated (repeatedly played-back) scenes can be considered to be scenes that the user likes, and their scene attributes can be incremented; skipped or fast-forwarded scenes can be considered to be scenes that the user does not like, and the counts (occurrence frequency) of their scene attributes can be decremented; the counts (occurrence frequency) of the scene attributes of deleted scenes can also be decremented as not being liked; the user's preferences can thereby be reflected on a finer scale.

When histograms representing the user's preferences are generated, by assigning weights to a histogram generated from the program played back most recently and a histogram generated from previous playbacks and adding the histograms together, the program recommendation tendency can be adjusted to react quickly to changes in the user's preferences (by changing quickly in response to the change in preferences, or assigning a greater weight to the latest preferences), or to react slowly (by attaching the greatest weight to the tendency of preferences accumulated over a long period of time).

Programs can be recommended without manual intervention by the user by analyzing the attributes of the programs when they are recorded and analyzing the user's preferences when programs are played back.

When the attributes of scenes are incorporated into a histogram, a histogram indicating the user's preferences that even takes scene length or playback time into account can be generated by considering the duration of each scene and, for example, incrementing the occurrence frequency according to the playback time (in seconds; by adding '1' for each second of playback time, for example).

The scene attributes are not fixed; an appropriate classification based on the attributes of programs actually recorded and played back can be made by subdividing attributes (for which purpose new attributes are generated) to limit the maximum value of the occurrence frequency in a histogram, by combining infrequently used attributes to create a new scene attribute, by discarding any scene attribute that has never been used at all, and by other such processing.

Second Embodiment

In the first embodiment the attribute of each scene in a recorded program was obtained by video or audio analysis; the second embodiment, in contrast, assigns attributes to scenes by analyzing metadata pre-assigned to each scene in a program. The metadata in the second embodiment include keywords representing features of scenes, arbitrary program sections, or particular frames, or numeric values having particular meanings. Keywords of a baseball program, for example, might include 'home run', 'error', 'strikeout', and players' names. For a drama or the like there are the characters' names, information indicating general locations such 'park' or 'station' and particular places such as 'Tokyo Station', and information indicating weather conditions such as 'rain' and 'sunshine', any of which is often expressed by keywords. Numeric values expressing video features might include a number expressing one of the 256 levels of R (red) in the RGB signal, or the score in a baseball game. The second embodiment is not limited to keywords only or numeric values only, but it will be described by taking keywords as examples, keywords being more abstract and more difficult to treat as unique features of scenes.

Figure 14:
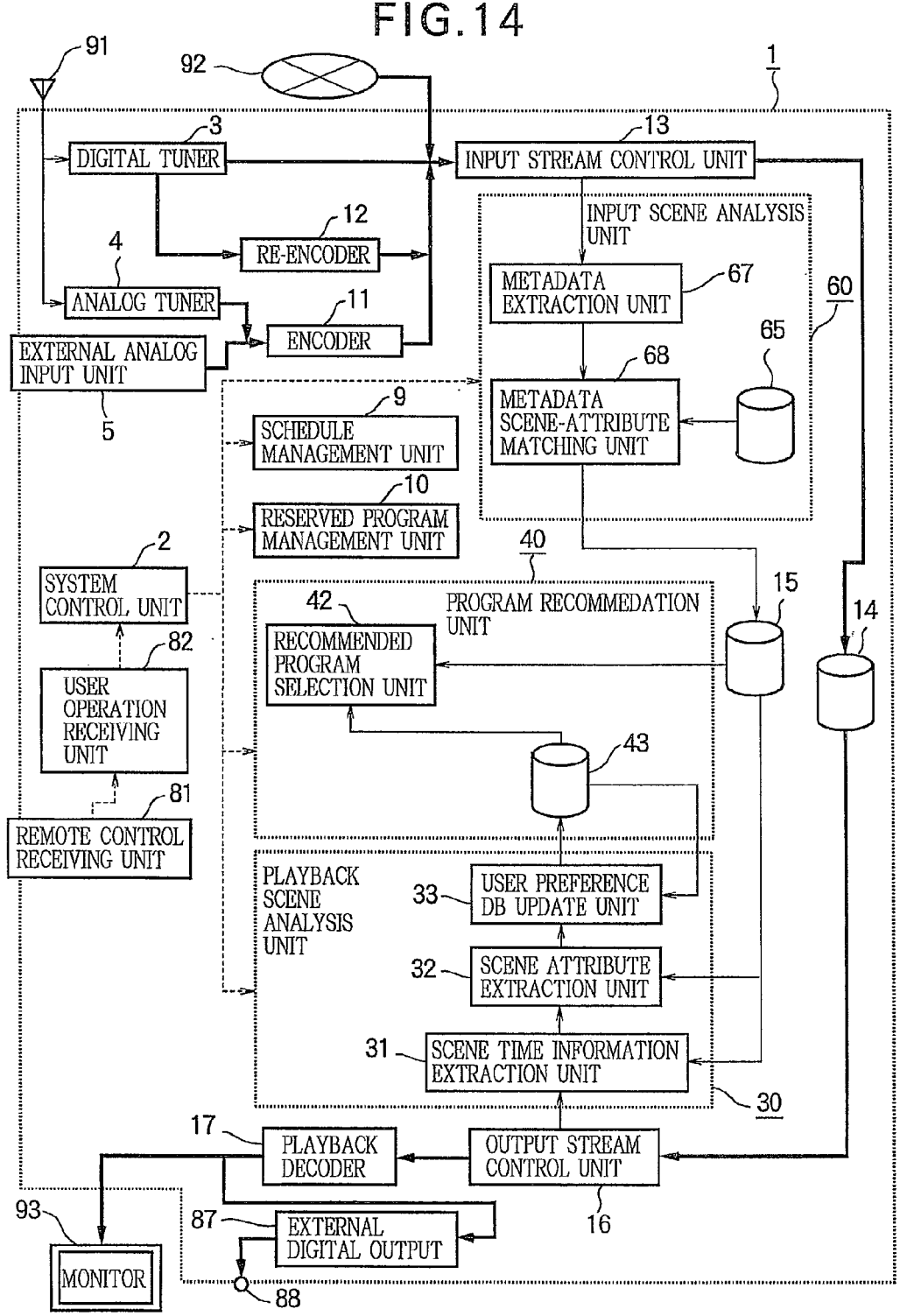
FIG. 14 is a block diagram illustrating the structure of a recording and playback apparatus having a program recommendation apparatus in a second embodiment of the invention.

FIG. 14 shows the structure of a recording and playback apparatus 1 having the program recommendation apparatus of the second embodiment. The recording and playback apparatus 1 in FIG. 14 is almost the same as the recording and playback apparatus shown in FIG. 1, but its input scene analysis unit 60 differs from the input scene analysis unit 20 in FIG. 1. The differences between input scene analysis unit 60 and input scene analysis unit 20 are as follows. The description below will focus on these differences. In the second embodiment, it is assumed that metadata are added to the broadcast signal or the audio-video stream downloaded from the network 92. Metadata are assigned or added to each scene and contain data indicating keywords.

When the input stream control unit 13 detects a stream of packets with metadata added, a metadata extraction unit 67 extracts the packets including metadata and extracts the metadata.

A keyword-attribute map memory 65 has a prestored keyword-attribute matching map (which may be referred to below simply as a matching map) indicating relationships between keywords and one or more corresponding attribute information items assigned to the keywords.

A metadata scene-attribute matching unit 68 compares the keywords extracted from the metadata assigned to each scene with the matching map and, if an extracted keyword is included in the matching map, decides that the scene having the extracted keyword has the attribute related with the keyword in the map. The same process is performed if the matching map does not include the keyword itself but includes a synonym of the keyword. A single scene may be found to have a plurality of attributes.

The table in FIG. 15 shows a specific example of a matching map showing relationships between attributes and keywords.

In the table shown in FIG. 15, program attributes are listed in the left column, and keywords assigned to the attributes are listed in the right column. Some keywords included in the matching map are related to a plurality of attributes, and the other keywords are related to a single attribute. Keywords not listed in the matching map may be treated in the same way as the listed keywords, if synonyms of these keywords are listed.

If the keyword 'rain' is extracted from the metadata of a scene, for example, FIG. 15 indicates that the scene has the 'movie', 'drama', and 'travel' attributes.

If an extracted keyword is a person's name, the metadata scene-attribute matching unit 68 decides that the scene to which the keyword was assigned has the 'movie', 'drama', and 'animation' attributes.

Figure 17:
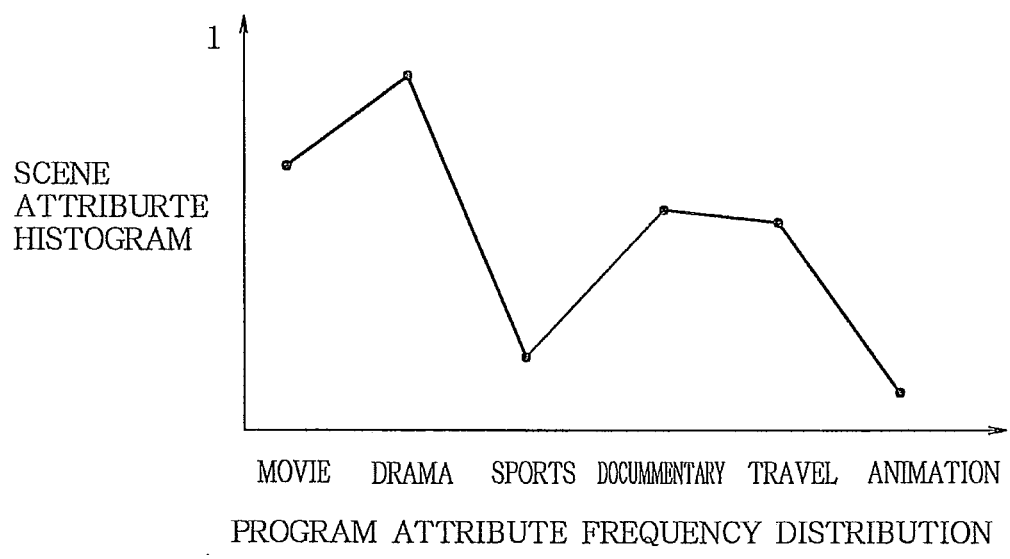
FIG. 17 is a scene attribute histogram generated in the second embodiment.

FIGS. 16(a) and 16(b) show an example of the matching of attributes to scenes of a broadcast program by use of the matching map shown in FIG. 15. FIG. 16(a) lists the delimited scenes of an audio-video stream received from, for example, a broadcast signal, with the starting time of each scene, and the keyword attached to the scene. FIG. 16(b) is obtained by assigning attribute information to keywords with reference to the matching map shown in FIG. 15. In FIG. 16(b), attributes matching scenes No. 1 to No. 14 in FIG. 16(a) are indicated by '1', and the boxes of non-matching attributes are left blank. The number of attributes related to a scene may be zero (scene No. 10, for example), one (scenes No. 4 and No. 5), or two or more. By performing the matching (assignment) throughout the program or a particular section thereof, adding the occurrence frequencies, and performing normalization, a graph (histogram) as shown in FIG. 17 is generated, with the horizontal axis indicating the attributes and the vertical axis indicating the normalized value of the occurrence frequency. From these results, it can be confirmed that the program taken as an example has a preponderance of drama-like scenes and very few scenes with sports or animation attributes.

By obtaining scene attributes from the metadata added to each scene and obtaining a frequency distribution of scene attributes, the attributes of the program and the tendencies of attributes can be extracted.

When the scene attributes of each scene are detected by the metadata scene-attribute matching unit 68, the detected attribute information C1 to C10 of each scene is recorded in the scene attribute database 15, together with the time information (starting time, ending time, and duration) and address information (position from the top of the program, byte length) of the scene.

By execution of this analysis process from the beginning to the end of a program or for an arbitrary section thereof, the occurrences (frequency) of the attributes of the scenes in this period (the period from the beginning to the end of the program, or a particular section) can be counted and scene attribute histograms can be obtained, indicating frequency distributions in the scenes of the whole program or particular section.

By adding up the frequency distributions of the individual attributes of a plurality of scenes, the metadata scene-attribute matching unit 68 also generates a frequency distribution (histogram) expressing the attributes of the program.

The metadata scene-attribute matching unit 68, keyword-attribute map memory 65, and scene attribute database 15 form a metadata scene attribute frequency distribution obtaining unit configured to count the occurrences (frequency) of scene attributes extracted from the metadata of each scene and obtain the occurrence frequency of each attribute obtained by the counting.

The method of extracting the user's preferences and the method of determining recommended programs are the same as in the first embodiment, so descriptions will be omitted.

The program recommendation apparatus of the second embodiment, structured as described above, can obtain attributes on a scene-by-scene basis from the metadata added to video or audio information. By using the attribute information obtained on a scene-by-scene basis, it can make attribute classifications on a scene-by-scene basis. Accordingly, an attribute classification can be made even when EPG information cannot be received.

Whereas an attribute classification made using an EPG can only classify with the attributes determined by the EPG information, the method of obtaining scene attributes from the metadata and the matching map allows a wide variety of detailed attributes to be specified, going beyond the range of given information such as the EPG, that is, the range of given attributes.

When an EPG is used, attributes are determined on a program-by-program basis, but with the method described in the second embodiment, attributes can be determined scene-by-scene, so attribute classifications can be made on a scene-by-scene basis, and searches can be performed on a scene-by-scene basis.

Because audio and video analysis of the program itself is not required, the processing load can be reduced in comparison with the method of analyzing the audio and video directly.

Since the attributes of a program comprising a plurality of scenes are expressed by a frequency distribution obtained by cumulative addition of scene-by-scene attributes, the attributes of the program can be expressed by the levels of a plurality of attributes, and the attributes can be expressed with a higher degree of freedom than when the attributes of a program are expressed by binary values indicating present or absent.

Because the program attributes are represented by a frequency distribution, when a plurality of programs are compared, the comparison can be made not as to whether an arbitrary attribute is present or not but as to the level of an arbitrary attribute of the program, so that the degree of closeness or correlativity can be expressed in multiple steps.

When the correlativity among a plurality of programs is obtained, the correlativity among the programs can be obtained by obtaining the correlativity among the frequency distributions of the programs.

When the user's preferences are analyzed, the user's preferences are obtained on a scene-by-scene basis, rather than from whether or not the program as a whole has been played back or edited, so processing can be carried out in scene units; for example, a repeated (repeatedly played-back) scene can be considered to be a scene that the user likes; the user's preferences can thereby be reflected on a finer scale.

When histograms representing the user's preferences are generated, by assigning weights to a histogram generated from the program played back most recently and a histogram generated from previous playbacks and adding the histograms together, the program recommendation tendency can be adjusted to react quickly or slowly to changes in the user's preferences.

When the attributes of scenes are incorporated into a histogram, a histogram indicating the user's preferences that even takes scene length or playback time into account can be generated by considering the duration of each scene and, for example, incrementing the occurrence frequency according to the playback time (in seconds; by adding '1' for each second of playback time, for example).

Although a method of extracting program attributes from keywords has been described in the second embodiment, numeric values indicating features of programs may be used, such as the RGB information and level values indicating highlight scenes.

Third Embodiment

Whereas the foregoing first embodiment had the function of recommending programs suited to the user's preferences from among recorded programs, the third embodiment recommends programs suited to the user's preferences from among programs yet to be broadcast, for use in programmed viewing and programmed recording.

Figure 18:
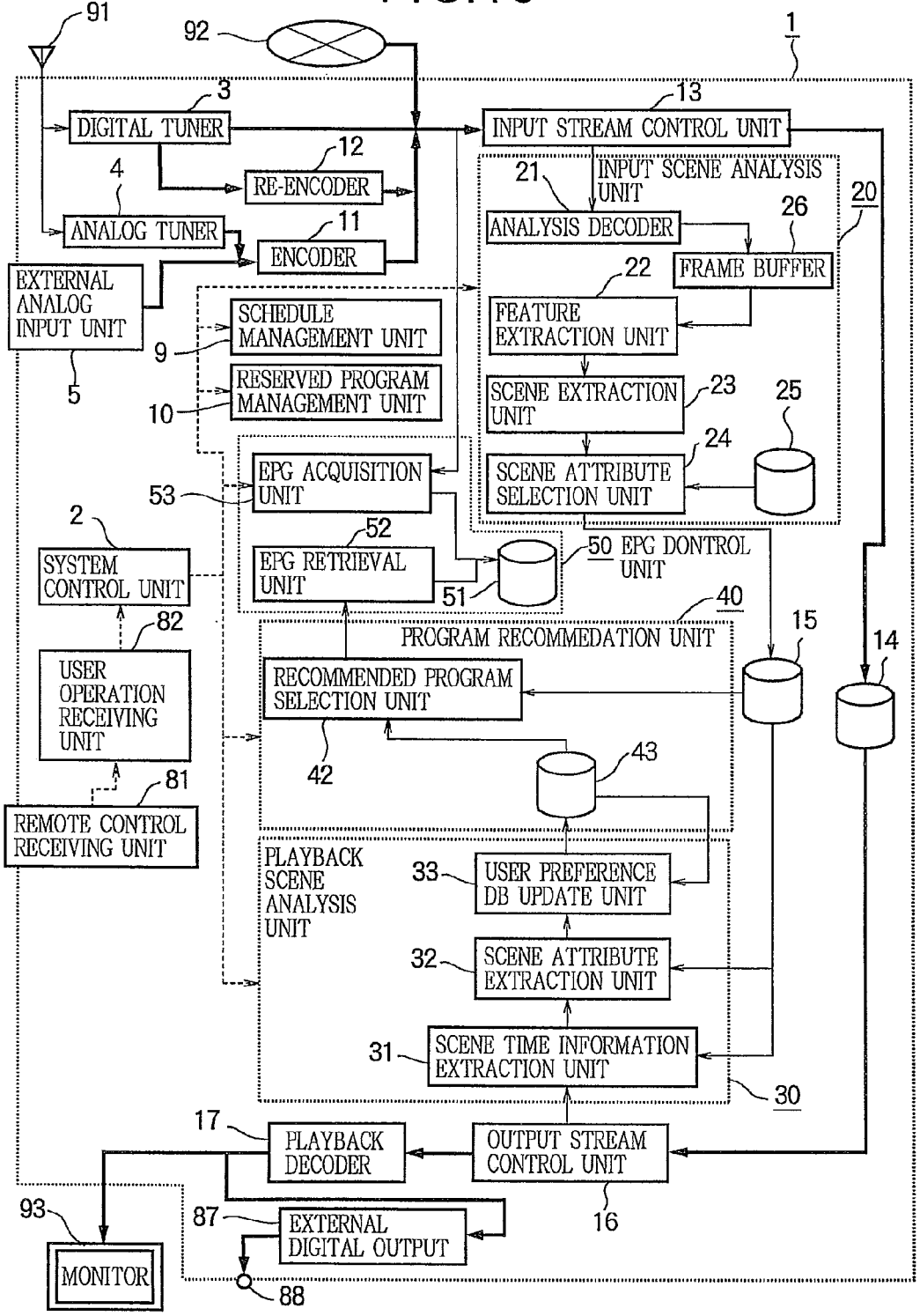
FIG. 18 is a block diagram illustrating the structure of a recording and playback apparatus having a program recommendation apparatus in a third embodiment of the invention.

FIG. 18 shows the structure of a recording and playback apparatus 1 having the program recommendation apparatus of the third embodiment. The recording and playback apparatus in FIG. 18 differs from the recording and playback apparatus in FIG. 1 in the structure of the program recommendation unit 40 and in that an EPG control unit 50 is added.

The EPG control unit 50 has an EPG acquisition unit 53 obtain EPG information from the broadcast signal or from the network 92 and records the title, time information, attributes, cast, description, and the like of each program in an EPG database 51.

An EPG retrieval unit 52 provides a search function for the EPG information, so that if a keyword is input, programs including the keyword can be extracted, and if a genre is specified, programs including the corresponding genre can be recommended. What is referred to here as the genre is the program attribute information included in the EPG information, and is determined uniquely by the EPG format.

The recommended program selection unit 42 in the program recommendation unit 40 recommends one or more programs close to the user's preferences from the programs yet to be broadcast, on the basis of the user preference histogram recorded in the user preference database 43.

The system control unit 2 provides the user with functions for performing programmed viewing or programmed recording automatically by using the reserved program management unit 10, automatically registers the programs recommended by the program recommendation unit 40 in the reserved program management unit 10, and specifies settings to start recording or viewing at the specified time in the schedule management unit 9 for recording or viewing of the programs.

Next the operation will be described. When given a program recommendation request by the system control unit 2, the recommended program selection unit 42 in the program recommendation unit 40 reads from the user preference database 43 a user preference histogram (FIG. 19) generated from the user's operation and playback history (such as the user's viewing history histogram shown in FIG. 5).

The recommended program selection unit 42 can search through the EPG data by using the EPG retrieval unit 52 to access the EPG database 51. One method of recommending a program from the EPG data by using the user preference histogram is to determine a plurality of recommended programs on the basis of the proportions of attributes indicated by the frequency distribution in the user preference histogram.

Figure 19:
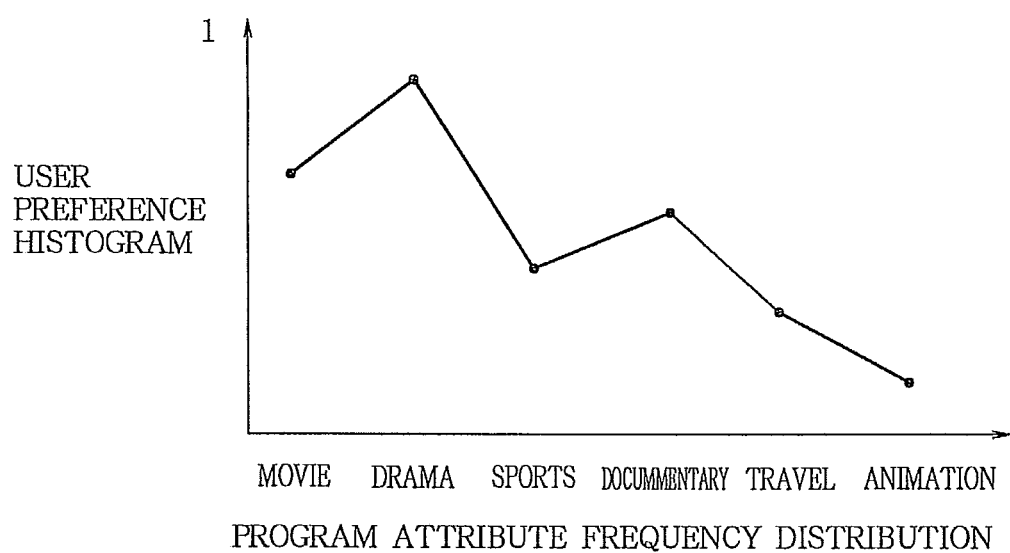
FIG. 19 is a user preference histogram used in the third embodiment.

If the user preference histogram is as shown in FIG. 19, for example, the frequency distribution has a movie-drama-sports-documentary-travel-animation ratio of 60:80:40:50:30:20; the genre search function of the EPG retrieval unit 52 can be used to determine a set of recommended programs having the same ratio. As another example, if the user preference histogram is as shown in FIG. 19, because the most frequent attribute is drama, the genre search function of the EPG retrieval unit 52 can be used to select only dramas.

Because the program recommendation apparatus of the third embodiment, structured as described above, can extract features of scenes from audio or video information, attribute classifications can be made on a scene-by-scene basis, and searches can be performed on a scene-by-scene basis.

Since the attributes of a program comprising a plurality of scenes are expressed by a frequency distribution obtained by cumulative addition of scene-by-scene attributes, the attributes of the program can be expressed by the levels of a plurality of attributes, and the attributes can be expressed with a higher degree of freedom than when the attributes of a program are expressed by binary values indicating present or absent.

When the correlativity among a plurality of programs is obtained, the correlativity among the programs can be obtained by obtaining the correlativity among the frequency distributions of the programs.

When the user's preferences are analyzed, the user's preferences are obtained on a scene-by-scene basis, rather than from whether or not the program as a whole has been played back or edited, so processing can be carried out in scene units; for example, a repeated (repeatedly played-back) scene can be considered to be a scene that the user likes; the user's preferences can thereby be reflected on a finer scale.

Fourth Embodiment

Whereas the foregoing first embodiment had the function of recommending, from among recorded programs, programs suited to the user's preferences, the fourth embodiment analyzes the user's preferences on the basis of the programs edited by the user and the attributes of scenes of those programs and recommends programs suited to the user's preferences for use in programmed viewing and programmed recording.

Figure 20:
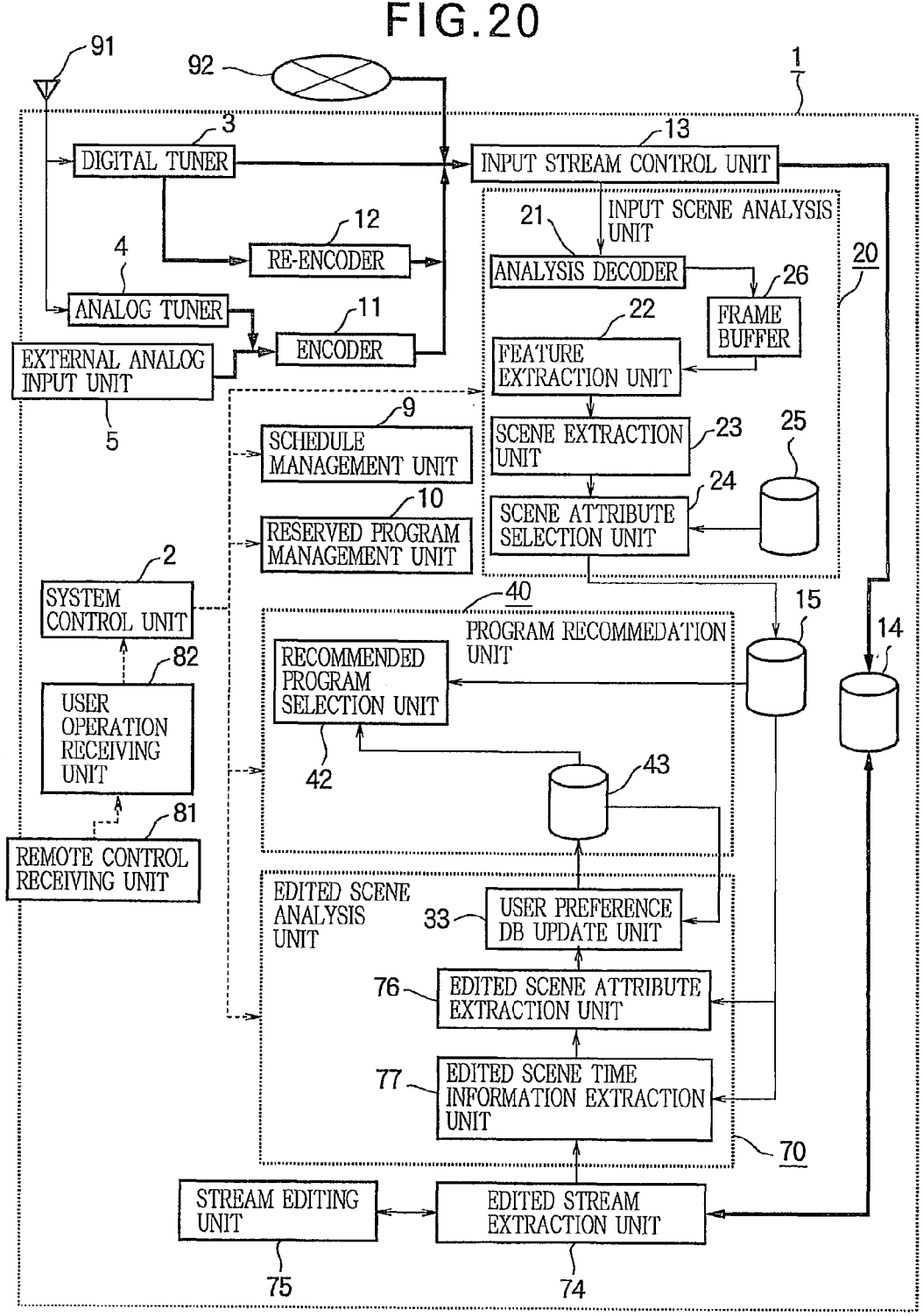
FIG. 20 is a block diagram illustrating the structure of a recording and playback apparatus having a program recommendation apparatus in a fourth embodiment of the invention.

FIG. 20 shows a recording and playback apparatus 1 having the program recommendation apparatus of the fourth embodiment. The recording and playback apparatus 1 shown in FIG. 20 is almost the same as the recording and playback apparatus 1 shown in FIG. 1, but has an edited scene analysis unit 70 instead of the program recommendation unit 30 in FIG. 1. The edited scene analysis unit 70 includes an editing scene information extraction unit 77, an editing scene attribute extraction unit 76, and a user preference database update unit 33.

This recording and playback apparatus also has an edited stream extraction unit 74 for reading streams corresponding to the program or scene to be edited, from among the streams recorded in the program storage unit 14, and a stream editing unit 75 for cutting, combining, or deleting the streams thus read and for cancelling chapters in arbitrary positions. The editing scene information extraction unit 77 extracts the time information of the scene to be edited from the stream read by the edited stream extraction unit 74; the editing scene attribute extraction unit 76 obtains the scene attributes of the scene to be edited, from the scene attribute database 15, in accordance with the time information; and the user preference database update unit 33 updates the contents of the user preference database 43.

Next the editing method will be described. Editing by cutting, in which the user deletes scenes, leaving just the user's favorite scenes, will be taken as an example.

Specifically, it will be assumed that in content having a playback time of five minutes, chapter points are set two minutes and three minutes from the beginning, the section between the two-minute point and the three-minute point is left, and the other parts are deleted. First, the user inputs an operation signal by using a user interface (not shown) or the like, to select the content to be edited, and confirms the content by playing it back or by other means. Next, the playback control information is read; in the area where chapter information is recorded, chapter #2 is specified to start two minutes from the beginning and chapter #3 is specified to start three minutes. It is assumed here that the first chapter (chapter #1) always starts at the beginning of the stream. The chapter points are not set in the stream itself but are recorded in the playback control information recorded simultaneously with the stream. Information recorded as chapter information includes the chapter number, the time at which the chapter starts, and position information in relation to the beginning of the stream. After the chapter information is recorded in the playback control information, the editing scene information extraction unit 77 reads the time information at the positions where the chapter points are set, the editing scene attribute extraction unit 76 reads scene attribute information from the scene attribute database in accordance with the time information, and the user preference database update unit 33 updates the user preference database 43 to increase the occurrence frequency of attributes matching the scene attributes recorded in the user preference database 43.

Next, a case of editing by cutting will be described. In editing by cutting, the edited stream extraction unit 74 reads the stream recorded in the program storage unit 14, deletes the part of the stream to be edited from the beginning to the two-minute point, and deletes the part after the three-minute position. At the same time, in the playback control information, the duration is altered to one minute, and the entry information is deleted, leaving the section between the two-minute position and the three-minute position from the beginning. This is how the stream is edited by cutting. Although the edited stream extraction unit 74 and stream editing unit 75 read the stream from the program storage unit 14 here, the editing may be performed directly on the program storage unit 14. The editing scene information extraction unit 77 reads the time of the section left after cut editing, the editing scene attribute extraction unit 76 reads the scene attribute information from the scene attribute database in accordance with the time information, and the user preference database update unit 33 updates the user preference database 43 to increase the frequency of attributes matching the remaining scene attributes recorded in the user preference database 43. Alternatively, instead of increasing the frequency of the remaining scene attributes, the frequency of the attributes corresponding to the deleted scenes may be decreased.

As has been described above, the user's preferences can be incorporated by obtaining the attributes of the scenes edited by chapter editing or cutting and increasing or decreasing the frequencies of the corresponding attributes recorded in the user preference database.

With the editing function, the user can perform a variety of operations not on whole programs but on scenes, which are smaller units than programs. From the scene editing operations, the user's scene preferences can be judged. For example, when a new program is created from favorite scenes extracted from a program or if a playlist of favorite scenes is created separately from the original program, the user's favorite scenes can be identified. When unnecessary scenes are deleted from a program, scenes that the user does not like can be identified. When the user sets a chapter point to facilitate access to a certain scene, the scene immediately after the chapter point can be identified as a very important scene.

Editing operations are generally performed less frequently than operations such as recording and playback. Because editing operations are performed by users with definite intentions, these operations may be regarded as clearly indicating the user's intentions and preferences. Incorporating information about edited scenes into the user preference database 43 in the fourth embodiment and updating the user's preferences accordingly is very useful in increasing the accuracy of the user preference database 43. Operations performed by users in playback also indicate the users' preferences, but actions such as fast-forwarding and skipping are temporary and do not reflect the user's preferences as clearly as editing, which is recorded permanently in the stream.

The program recommendation apparatus of the fourth embodiment, structured as described above, can obtain a user's preferences on a scene-by-scene basis in accordance with editing operations.

Because the user's preferences are obtained by editing operations, which are usually not performed frequently, the user's preferences can be obtained with high precision.

Different editing operations can be assigned weights, and the frequency increment can be varied depending on the type of operation, such as increasing the frequency of an attribute of a scene for which a chapter is specified by '1' and increasing the frequency of an attribute of a scene included in a playlist by '2'.

In the fourth embodiment, the scene attributes are pre-provided, but the scene attributes of a scene to be edited may be analyzed during the editing operation. In that case, the scene attributes do not need to be extracted during recording.

Recording and playback apparatus embodying the present invention has been described, but the present invention can be applied to apparatus that has a playback function without having a recording function (playback apparatus), and to apparatus that has a recording function without having a playback function (recording apparatus). The present invention can also be applied to apparatus that does not have a recording function but has just an editing function.

What is claimed is:

1. A program recommendation apparatus comprising:
a playback unit configured to playback or distribute audio-video content;
a metadata obtaining unit configured to obtain metadata of audio-video content when the audio-video content is played back or distributed by the playback unit;
a frequency distribution obtaining unit configured to detect scene changes in the audio-video content, and extract scene attributes from the metadata of each scene, the attribute of each scene being obtained from metadata of video content of each scene, said each scene comprised of images between successive scene changes,
said frequency distribution obtaining unit counting occurrences of each of the scene attributes, thereby obtaining an occurrence frequency of each attribute over a plurality of items of audio-video content having been played back or distributed; and
a recommended program selection configured to recommending audio-video content to be recorded or played back based on a frequency distribution obtained by the frequency distribution obtaining unit.

2. A program recommendation apparatus comprising:
a playback unit configured to play back or distribute audio-video content;
a scene attribute extraction unit configured to detect scene changes in the audio-video content, and extract attributes of scenes of the audio-video content that has been played back or distributed, when the audio-video content is played back or distributed by the playback unit, the attribute of each scene being obtained from feature information of video content of each scene, said each scene comprised of images between successive scene changes;
a frequency distribution obtaining unit configured to count occurrences of the attributes of the scenes extracted by the scene attribute extraction unit and obtain an occurrence frequency of each of the extracted attributes over a plurality of items of audio-video content having been played back or distributed; and
a recommended program selection unit configured to recommend audio-video content to be recorded or played back based on a frequency distribution obtained by the frequency distribution obtaining unit.

3. The program recommendation apparatus of claim 2, wherein:
based on the occurrence frequency of each of the attributes, the scene attribute extraction unit
generates a new scene attribute by subdividing an arbitrary scene attribute;
generates a new scene attribute by combining existing scene attributes; or
discards an existing scene attribute.

4. A program recommendation apparatus comprising:
an editing unit configured to edit audio-video content;
a scene attribute extraction unit configured to detect scene changes in the audio-video content, and extract attributes of scenes edited by the editing unit, the attribute of each scene being obtained from feature information of video content of each scene, said each scene comprised of images between successive scene changes;
a frequency distribution obtaining unit configured to count occurrences of each of the scene attributes extracted by the scene attribute extraction unit and obtain an occurrence frequency of each of the extracted attributes over a plurality of items of audio-video content having been edited; and
a recommended program selection unit configured to recommend audio-video content to be recorded or played back based on a frequency distribution obtained by the frequency distribution obtaining unit.

5. The program recommendation apparatus of claim 4, wherein:
based on the occurrence frequency of each of the attributes, the scene attribute extraction unit
generates a new scene attribute by subdividing an arbitrary scene attribute;
generates a new scene attribute by combining existing scene attributes; or
discards an existing scene attribute.

6. A program recommendation apparatus comprising:
a recording unit configured to record audio-video content;
a recorded scene attribute extraction unit configured to, when the audio-video content is recorded by the recording unit, detect scene changes in the audio-video content, and extract an attribute of each scene of the recorded audio-video content, the attribute of each scene being obtained from feature information of video content of each scene, said each scene comprised of images between successive scene changes;
a recorded scene attribute frequency distribution obtaining unit configured to count occurrence frequencies of scene attributes extracted by the recorded scene attribute extraction unit, and obtain an occurrence frequency of each extracted attribute in each item of audio-video content;
a playback unit configured to play back or distribute the audio-video content;
a playback scene attribute extraction unit configured to extract an attribute of each scene of the audio-video content that has been played back or distributed when the audio-video content is played back or distributed by the playback unit;
a playback scene attribute frequency distribution obtaining unit configured to count occurrence frequencies of scene attributes extracted by the playback scene attribute extraction unit, and obtain an occurrence frequency of each extracted attribute over a plurality of items of audio-video content having been recorded; and
a recommended program selection unit configured to recommend audio-video content to be played back next, based on a scene attribute frequency distribution obtained by the recorded scene attribute frequency distribution obtaining unit and a scene attribute frequency distribution obtained by the playback scene attribute frequency distribution obtaining unit.

7. The program recommendation apparatus of claim 6, wherein audio-video content to be played back next is recommended according to correlativity of the scene attribute frequency distribution obtained by the recorded scene attribute frequency distribution obtaining unit with the scene attribute frequency distribution obtained by the playback scene attribute frequency distribution obtaining unit.

8. A program recommendation apparatus comprising:
a scene extraction unit configured to, when each item of audio-video content is recorded, extract scenes each forming part of said each item of the audio-video content;
a first frequency distribution obtaining unit configured to extract an attribute of each scene extracted by the scene extraction unit, and count occurrence frequencies of the extracted attributes, to obtain a first frequency distribution comprised of occurrence frequencies of the respective attributes;
a scene attribute extraction unit configured to extract an attribute of each scene forming part of each item of audio-video content;
a second frequency distribution obtaining unit configured to count occurrence frequencies of the respective attributes extracted by the scene attribute extraction unit, to obtain a second frequency distribution comprised of occurrence frequencies of the respective attributes extracted by the scene attribute extraction unit; and
a recommended program selection unit configured to recommend audio-video content to be recorded or played back, based on the first frequency distribution and the second frequency distribution; wherein
the first frequency distribution obtaining unit counts the occurrence frequency of each scene attribute in each item of audio-video content, and obtains the result of the counting as the first frequency distribution of said each item of audio-video content; and
the scene attribute extraction unit extracts the attribute of each scene subjected to playback, distribution or editing, based on the operation by the user for the playback, distribution, or editing;
the second frequency distribution obtaining unit counts the occurrence frequency of each scene attribute over a plurality of items of audio-video content having been subjected to playback, distribution, or editing, and obtains the result of counting as the second frequency distribution.

9. The program recommendation apparatus of claim 8, wherein the recommended program selection unit recommends the audio-video content based on the correlativity between the first frequency distribution and the second frequency distribution.

10. The program recommendation apparatus of claim 8, wherein
the first frequency distribution obtaining unit extracts the attribute of each scene by analyzing the audio or video of each scene of each item of audio-video content.

11. The program recommendation apparatus of claim 8, wherein
- based on the occurrence frequency of each of the attributes, each of the first and second frequency distribution obtaining unit
- generates a new scene attribute by subdividing an arbitrary scene attribute;
- generates a new scene attribute by combining existing scene attributes; or
- discards an existing scene attribute.

* * * * *